(12) United States Patent
Kobayashi et al.

(10) Patent No.: US 10,090,787 B2
(45) Date of Patent: Oct. 2, 2018

(54) VARIABLE ELECTRIC MOTOR SYSTEM AND ELECTRICALLY POWERED DEVICE

(71) Applicant: MITSUBISHI HEAVY INDUSTRIES COMPRESSOR CORPORATION, Tokyo (JP)

(72) Inventors: Masahiro Kobayashi, Hiroshima (JP); Yoshiyuki Okamoto, Hiroshima (JP); Yasushi Mori, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 0 days.

(21) Appl. No.: 15/320,905

(22) PCT Filed: Jul. 17, 2015

(86) PCT No.: PCT/JP2015/070580
§ 371 (c)(1),
(2) Date: Dec. 21, 2016

(87) PCT Pub. No.: WO2016/010146
PCT Pub. Date: Jan. 21, 2016

(65) Prior Publication Data
US 2017/0141706 A1 May 18, 2017

(30) Foreign Application Priority Data

Jul. 18, 2014 (WO) .................. PCT/JP2014/069253
Feb. 23, 2015 (WO) .................. PCT/JP2015/055064

(51) Int. Cl.
*H02P 5/747* (2006.01)
*H02K 7/116* (2006.01)
(Continued)

(52) U.S. Cl.
CPC ............. *H02P 5/747* (2013.01); *F16H 48/10* (2013.01); *F16H 63/50* (2013.01); *H02K 7/116* (2013.01);
(Continued)

(58) Field of Classification Search
CPC ........... H02P 5/747; H02P 5/00; H02K 17/02; H02K 7/116; H02K 7/14; F16H 48/10; F16H 63/50
See application file for complete search history.

(56) References Cited

U.S. PATENT DOCUMENTS 5,062,824 A * 11/1991 Prokopius ................. F16H 1/46
475/342
5,090,261 A 2/1992 Nakatsukasa
(Continued)

FOREIGN PATENT DOCUMENTS

DE 2 239 588 A1 2/1974
EP 1 961 602 A1 8/2008
(Continued)

OTHER PUBLICATIONS

International Search Report and Written Opinion of the International Search Authority (Forms PCT/ISA/237 and PCT/ISA/210) for International Application No. PCT/JP2014/069253, dated Sep. 22, 2014, with an English translation thereof.
(Continued)

*Primary Examiner* — David J Hlavka
(74) *Attorney, Agent, or Firm* — Birch, Stewart, Kolasch & Birch, LLP

(57) ABSTRACT

This variable electric motor system comprises an electrically powered device and a planet gear transmission device. One of a sun gear shaft, a planet gear carrier shaft, and an internal gear carrier shaft of the planet gear transmission device constitutes an output shaft, another shaft constitutes a con-
(Continued)

stant-speed input shaft, and the other shaft constitutes a variable-speed input shaft. The electrically powered device includes: a constant-speed electric motor including a constant-speed rotor that rotates about the axis, and that is connected to the constant-speed input shaft; and a variable-speed electric motor including a variable-speed rotor that rotates about the axis, and that is connected to the variable-speed input shaft. The variable-speed rotor has a shaft insertion hole formed therethrough in the axial direction, the shaft insertion hole having a cylindrical shape centered on the axis. The constant-speed rotor is inserted through the shaft insertion hole.

30 Claims, 13 Drawing Sheets

(51) Int. Cl.

| | | |
|---|---|---|
| *H02P 5/00* | (2016.01) | |
| *H02K 7/14* | (2006.01) | |
| *H02K 17/02* | (2006.01) | |
| *F16H 63/50* | (2006.01) | |
| *F16H 48/10* | (2012.01) | |

(52) U.S. Cl.
CPC ............... *H02K 7/14* (2013.01); *H02K 17/02* (2013.01); *H02P 5/00* (2013.01)

(56) References Cited

U.S. PATENT DOCUMENTS

| | | | |
|---|---|---|---|
| 5,947,854 A | 9/1999 | Kopko | |
| 6,555,927 B1 | 4/2003 | Suzuki et al. | |
| 6,808,468 B1 | 10/2004 | Miyazaki et al. | |
| 7,207,919 B2 * | 4/2007 | Tsuneyoshi | B60K 6/445 477/5 |
| 7,322,891 B1 * | 1/2008 | Prewitt | A63B 69/3685 473/236 |
| 7,609,011 B2 * | 10/2009 | Yatabe | B60W 20/30 180/65.285 |
| 2003/0064847 A1 * | 4/2003 | Oshidari | B60K 6/365 475/5 |
| 2006/0019756 A1 | 1/2006 | Lattin | |
| 2006/0264296 A1 | 11/2006 | Moeller | |
| 2007/0155570 A1 * | 7/2007 | Kimura | F16H 3/724 475/153 |
| 2013/0249444 A1 | 9/2013 | Golding | |
| 2014/0194214 A1 | 7/2014 | Maeda | |
| 2017/0155345 A1 | 6/2017 | Kobayashi et al. | |

FOREIGN PATENT DOCUMENTS

| | | |
|---|---|---|
| FR | 2 094 518 A5 | 2/1972 |
| JP | 59-70497 A | 4/1984 |
| JP | 1-176247 U | 12/1989 |
| JP | 3-73745 U | 7/1991 |
| JP | 7-135701 A | 5/1995 |
| JP | 2000-324607 A | 11/2000 |
| JP | 2001-152901 A | 6/2001 |
| JP | 2003-34153 A | 2/2003 |
| JP | 2004-116542 A | 4/2004 |
| JP | 2004-150609 A | 5/2004 |
| JP | 2005-153727 A | 6/2005 |
| JP | 2006-38228 A | 2/2006 |
| JP | 2006-521517 A | 9/2006 |
| JP | 4183481 B2 | 11/2008 |
| JP | 4472350 B2 | 6/2010 |
| JP | 2010-242811 A | 10/2010 |
| JP | 2014-87170 A | 5/2014 |
| WO | WO 01/85483 A1 | 11/2001 |
| WO | WO 03/071160 A1 | 8/2003 |
| WO | WO 2013/035172 A1 | 3/2013 |
| WO | WO 2016/009668 A1 | 1/2016 |

OTHER PUBLICATIONS

International Search Report and Written Opinion of the International Search Authority (Forms PCT/ISA/237 and PCT/ISA/210) for International Application No. PCT/JP2015/055064, dated May 19, 2015, with an English translation thereof.

International Search Report and Written Opinion of the International Search Authority (Forms PCT/ISA/237 and PCT/ISA/210) for International Application No. PCT/JP2015/070580, dated Sep. 29, 2015, with an English translation thereof.

* cited by examiner

VARIABLE ELECTRIC MOTOR SYSTEM AND ELECTRICALLY POWERED DEVICE

This application claims priority based on International Application No. PCT/JP2014/069253, filed in Japan on Jul. 18, 2014, and International Application No. PCT/JP2015/055064, filed in Japan on Feb. 23, 2015, of which the contents are incorporated herein by reference.

TECHNICAL FIELD

The present invention relates to a variable electric motor system and an electrically powered device.

BACKGROUND ART

A system including an electrically powered device that generates rotational driving force, a transmission device that changes the speed of the rotational driving force generated by the electrically powered device and transmits that force to a driving target, and the driving target that is driven by the rotational driving force from the electrically powered device can be given as an example of a variable electric motor system.

Patent Document 1 listed below discloses this type of variable electric motor system. The transmission device of this variable electric motor system is a planet gear transmission device. The transmission device includes a sun gear that rotates about the axis, a plurality of planet gears that mesh with the sun gear and revolve around the axis as well as rotating about their own center lines, an arm or carrier that supports the plurality of planet gears, and an internal gear that has a plurality of teeth arranged in an annular shape around the axis and that meshes with the planet gears. An arm shaft extending in the axial direction centered on the axis is fixed to the arm. This arm shaft constitutes an output shaft connected to the driving target.

The electrically powered device of this variable electric motor system includes a sub-motor that rotates the sun gear about the axis, a transmission mechanism that transmits rotational driving force of the sub-motor to the sun gear, a main motor that rotates the internal gear about the axis, and a transmission mechanism that transmits rotational driving force of the main motor to the internal gear. A rotor shaft of the sub-motor and a rotor shaft of the main motor are both disposed parallel to the axis of the transmission device and distanced from that axis in a radial direction. Each transmission mechanism includes belts and pulleys.

According to this variable electric motor system, the RPM of the output shaft connected to the driving target can be changed by changing the RPM of the sub-motor.

CITATION LIST

Patent Document

Patent Document 1: Japanese Unexamined Patent Application Publication No. S59-070497

SUMMARY OF INVENTION

Technical Problem

In the variable electric motor system according to Patent Document 1, the two motors are disposed distanced from the axis of the transmission device in the radial direction, and there is thus a problem in that the overall size of the system is increased. Furthermore, because the two motors are disposed distanced from the axis of the transmission device in the radial direction, this variable electric motor system requires the transmission mechanism including belts, pulleys, and the like to be provided for each of the motors, and there is thus a problem in that the device becomes complicated and incurs higher manufacturing costs.

Accordingly, an object of the present invention is to provide a variable electric motor system and an electrically powered device thereof that allow for a reduction in size and a reduction in manufacturing cost.

Solution to Problem

To solve the above-described problems, a variable electric motor system according to one aspect of the invention includes: an electrically powered device that generates rotational driving force; a transmission device that changes speed of the rotational driving force generated by the electrically powered device; and a driving target that is driven by the rotational driving force from the electrically powered device. The transmission device includes: a sun gear that rotates about an axis; a sun gear shaft that is fixed to the sun gear and extends in an axial direction centered on the axis; a planet gear that meshes with the sun gear, revolves around the axis, and rotates about its own center line; an internal gear that has a plurality of teeth arranged in an annular shape centered on the axis, and meshes with the planet gear; a planet gear carrier that has a planet gear carrier shaft extending in the axial direction centered on the axis, and supports the planet gear so as to allow the planet gear to revolve around the axis and to rotate about its own center line; and an internal gear carrier that has an internal gear carrier shaft extending in the axis direction centered on the axis, and supports the internal gear so as to allow the internal gear to rotate about the axis. One of the sun gear shaft, the planet gear carrier shaft, and the internal gear carrier shaft constitutes an output shaft connected to a rotor of the driving target, another shaft constitutes a constant-speed input shaft, and the other shaft constitutes a variable-speed input shaft. The electrically powered device includes: a constant-speed electric motor having a constant-speed rotor that rotates about the axis and is connected directly or indirectly to the constant-speed input shaft of the transmission device; and a variable-speed electric motor having a variable-speed rotor that rotates about the axis and is connected directly or indirectly to the variable-speed input shaft of the transmission device. Of the variable-speed rotor and the constant-speed rotor, a first rotor has a shaft insertion hole formed therethrough in the axial direction, the shaft insertion hole having a cylindrical shape centered on the axis, and a second rotor is inserted through the shaft insertion hole of the first rotor, and the rotor of the driving target is disposed on the axis.

According to this variable electric motor system, the constant-speed rotor of the constant-speed electric motor and the variable-speed rotor of the variable-speed electric motor are disposed on the axis of the transmission device, which makes it possible to reduce the overall size compared to a case where the constant-speed rotor and the variable-speed rotor are disposed distanced from the axis of the transmission device in the radial direction. Furthermore, according to this variable electric motor system, it is not necessary to provide a transmission mechanism such as belts or pulleys, unlike the case where the constant-speed rotor and the variable-speed rotor are disposed distanced from the axis of the transmission device in the radial direction. This configuration allows for a reduction in size of the device and, furthermore, allows for a reduction in the number of components, which makes it possible to reduce manufacturing costs. Additionally, according to this variable electric motor system, it is not necessary to provide a transmission mechanism such as belts or pulleys as described above. This configuration prevents flexural loads from being applied to the shafts located on the axis of the transmission device from such belts or the like, which makes it possible to reduce vibrations as well.

Here, in the variable electric motor system, the variable-speed rotor may be the first rotor, the constant-speed rotor may be divided into a constant-speed rotor main body shaft and a constant-speed rotor extension shaft that is inserted through the shaft insertion hole, and the system may further include a constant-speed flexible coupling that connects the constant-speed rotor main body shaft and the constant-speed rotor extension shaft.

Additionally, the variable-speed electric motor may include a variable-speed stator disposed on an outer peripheral side of the variable-speed rotor and a variable-speed electric motor casing having the variable-speed stator fixed to an inner peripheral side thereof. The transmission device may include the sun gear, the sun gear shaft, the planet gear, the internal gear, the planet gear carrier shaft, the planet gear carrier, and the internal gear carrier, and a transmission casing that covers these components. The transmission casing may be fixed to the variable-speed electric motor casing.

Additionally, in the variable electric motor system, the constant-speed electric motor may include a constant-speed stator disposed on an outer peripheral side of the constant-speed rotor, and a constant-speed electric motor casing having the constant-speed stator fixed to an inner peripheral side thereof, and the system may further include an electrically powered device support portion that supports the constant-speed electric motor casing.

Additionally, the variable electric motor system may further include a transmission device support portion that supports the variable-speed electric motor casing.

According to this variable electric motor system, the constant-speed electric motor and the variable-speed electric motor, which are heavy objects, can be securely fixed by using these support portions.

Additionally, in the variable electric motor system, the transmission casing may be fixed to the variable-speed electric motor casing.

Additionally, in the variable electric motor system, the variable-speed electric motor and the transmission device may be supported by a shared frame.

According to this variable electric motor system, integrating the variable-speed electric motor and the transmission device by using the frame makes it possible to transport the variable-speed electric motor and the transmission device as a single unit without being separated when the variable electric motor system is to be installed, for example. Accordingly, the task of aligning the output shaft of the variable-speed electric motor with the input shaft of the transmission device at the site where the variable electric motor system is installed can be eliminated.

Additionally, in the variable electric motor system, the variable-speed rotor may be the first rotor, and the system may further include a constant-speed flexible coupling that connects the constant-speed rotor and the constant-speed input shaft, and a gear coupling that connects the variable-speed rotor and the variable-speed input shaft.

Additionally, in the variable electric motor system, the variable-speed rotor may be the first rotor, the system may further include a gear coupling that connects the variable-speed rotor and the variable-speed input shaft, and the constant-speed rotor and the constant-speed input shaft may be connected via flanges formed in the constant-speed rotor and the constant-speed input shaft, or may be integrated.

Additionally, in the variable electric motor system, tooth trace correction may be carried out on the gears constituting the gear coupling.

Additionally, in the variable electric motor system, the variable-speed rotor may be the first rotor, and the system may further include a constant-speed flexible coupling that connects the constant-speed rotor and the constant-speed input shaft, and a damper coupling that connects the variable-speed rotor and the variable-speed input shaft. The damper coupling may include a damper coupling first portion fixed to the variable-speed rotor, a damper coupling second portion fixed to the variable-speed input shaft, a claw portion provided in at least one of the damper coupling first portion and the damper coupling second portion, a damper rubber that covers the claw portion, and a claw housing hole provided in at least one of the damper coupling first portion and the damper coupling second portion, the claw portion covered by the damper rubber fitting into the claw housing hole.

Here, the variable electric motor system may further include a constant-speed flexible coupling that connects the constant-speed rotor and the constant-speed input shaft, and a variable-speed flexible coupling that connects the variable-speed rotor and the variable-speed input shaft.

According to this variable electric motor system, eccentricity, deviation, and wobble can be permitted, by the constant-speed flexible coupling, between the constant-speed rotor of the electrically powered device and the constant-speed input shaft of the transmission device. Furthermore, according to this variable electric motor system, eccentricity, deviation, and wobble can be permitted, by the variable-speed flexible coupling, between the variable-speed rotor of the electrically powered device and the variable-speed input shaft of the transmission device. As such, according to this variable electric motor system, the burden of operations for centering the transmission device relative to the electrically powered device can be kept to a minimum, and the transmission of shaft wobble from the electrically powered device to the transmission device and the transmission of shaft wobble from the transmission device to the electrically powered device can be suppressed.

Additionally, in the variable electric motor system including the constant-speed flexible coupling and the variable-speed flexible coupling, of the constant-speed flexible coupling and the variable-speed flexible coupling, the flexible coupling connected to the first rotor may constitute a first flexible coupling, of the constant-speed input shaft and the variable-speed input shaft, the input shaft rotated by rotation of the first rotor may constitute a first input shaft, a rotor-side connecting portion having an annular shape centered on the axis and connected to the first flexible coupling may be formed at an end of the first rotor adjacent to the transmission device side, and a transmission device-side connecting portion having an annular shape centered on the axis and connected to the first flexible coupling so as to face the rotor-side connecting portion in the axial direction may be formed at an end of the first input shaft adjacent to the electrically powered device.

According to this variable electric motor system, the rotor-side connecting portion of the first rotor disposed on the outer peripheral side of the second rotor and the transmission device-side connecting portion of the first input shaft connected to the first rotor via the first flexible coupling face each other in the axial direction. Accordingly, a typical flexible coupling, or in other words, a generic flexible coupling can be employed as the first flexible coupling.

Additionally, in any one of the above-described variable electric motor systems including the constant-speed flexible coupling and the variable-speed flexible coupling, of the constant-speed flexible coupling and the variable-speed flexible coupling, the flexible coupling connected to the first rotor may constitute the first flexible coupling and the flexible coupling connected to the second rotor may constitute a second flexible coupling. The first flexible coupling may be disposed on an outer peripheral side of the second flexible coupling relative to the axis, and a length dimension of the second flexible coupling in an axial direction thereof may be less than or equal to a length dimension of the first flexible coupling in an axial direction thereof.

According to this variable electric motor system, the second flexible coupling is disposed on an inner peripheral side of the first flexible coupling, but because the length dimension of the second flexible coupling in the axial direction is less than or equal to the length dimension of the first flexible coupling in the axial direction, operations for attaching the flexible couplings can be carried out with ease.

Additionally, in any one of the above-described variable electric motor systems, the constant-speed electric motor may include a constant-speed stator disposed on an outer peripheral side of the constant-speed rotor and a constant-speed electric motor casing having the constant-speed stator fixed to an inner peripheral side thereof. The variable-speed electric motor may include a variable-speed stator disposed on an outer peripheral side of the variable-speed rotor and a variable-speed electric motor casing having the variable-speed stator fixed to an inner peripheral side thereof. The variable-speed electric motor casing may be fixed to the constant-speed electric motor casing.

According to this variable electric motor system, the variable-speed electric motor casing is fixed to the constant-speed electric motor casing. As such, according to this variable electric motor system, the variable-speed rotor can be positioned (centered) accurately relative to the constant-speed rotor before the variable electric motor system is shipped from the factory. Thus according to this variable electric motor system, operations for positioning the variable-speed rotor relative to the constant-speed rotor need not be carried out at the site where the system is installed.

Additionally, the variable electric motor system may further include an electrically powered device support portion that supports the constant-speed electric motor casing.

Additionally, the variable electric motor system may further include a variable-speed electric motor support portion that supports the variable-speed electric motor casing.

Additionally, the variable electric motor system may further include a transmission device support portion that supports the transmission casing.

The variable electric motor system in which the variable-speed electric motor casing is fixed to the constant-speed electric motor casing may further include a cooling fan attached to an end of the second rotor remote from the transmission device. The constant-speed electric motor casing and the variable-speed electric motor casing may communicate with each other so that a gas flow is produced within the constant-speed electric motor casing and within the variable-speed electric motor casing by the cooling fan rotating.

According to this variable electric motor system, the cooling fan provided at the end of the second rotor rotates as the second rotor rotates. The rotation of the cooling fan causes air to flow into one of the constant-speed electric motor casing and the variable-speed electric motor casing from the outside and to cool the rotor, stator, and the like in the one casing. Furthermore, according to this variable electric motor system, the constant-speed electric motor casing and the variable-speed electric motor casing communicate with each other, and thus the air flowing into the one casing also flows into the other casing and cools the rotor, stator, and the like in the other casing. Thus according to this variable electric motor system, the two electric motors can be cooled by the single cooling fan. This configuration allows for a reduction in size of the device and allows for a reduction in manufacturing cost.

Additionally, any one of the above-described variable electric motor systems may further include: a frequency conversion device that changes a frequency of power to be supplied to the variable-speed electric motor, a first switch that puts the constant-speed electric motor into a power-supplied state or a power-cutoff state, a second switch that puts the variable-speed electric motor into a power-supplied state or a power-cutoff state, and a controller that makes an instruction, to the frequency conversion device, indicating the frequency of the power to be supplied to the variable-speed electric motor, and instructs the first switch and the second switch to be turned on and off.

According to this variable electric motor system, the constant-speed electric motor and the variable-speed electric motor can be controlled to be driven and to be stopped, and the RPM of the variable-speed electric motor can be controlled as well.

In the variable electric motor system including the controller, the sun gear shaft may constitute the output shaft, the planet gear carrier shaft may constitute the variable-speed input shaft, and the internal gear carrier shaft may constitute the constant-speed input shaft. Upon receiving an instruction to start up, the controller may instruct the second switch to be turned on to put the variable-speed electric motor into the power-supplied state, make an instruction, to the frequency conversion device, indicating a predetermined minimum frequency, and after the variable-speed electric motor has started to be driven at the minimum frequency, instructs the first switch to be turned on to put the constant-speed electric motor into the power-supplied state.

According to this variable electric motor system, the RPM of the output shaft when only the variable-speed electric motor is rotated at the minimum RPM will be RPM lower than the RPM range of the output shaft when both the constant-speed electric motor and the variable-speed electric motor are rotating. Accordingly, in this variable electric motor system, at startup, the output shaft is rotated by rotating only the variable-speed electric motor at the minimum RPM, and the startup load torque of the electrically powered device is reduced.

In the variable electric motor system including the controller, the sun gear shaft may constitute the output shaft, the planet gear carrier shaft may constitute the variable-speed input shaft, and the internal gear carrier shaft may constitute the constant-speed input shaft. Upon receiving an instruction to start up, the controller may instruct the first switch to be turned on to put the constant-speed electric motor into the power-supplied state, after the constant-speed electric motor has started to be driven at predetermined RPM, instructs the second switch to be turned on to put the variable-speed electric motor into the power-supplied state, and make an instruction, to the frequency conversion device, indicating a predetermined minimum frequency.

Additionally, a variable electric motor system according to another aspect of the invention includes: a transmission device including an output shaft connected to a driving target, a constant-speed input shaft that is rotated at a constant speed, and a variable-speed input shaft that is rotated at a variable speed, RPM of the output shaft being determined on the basis of RPM of the variable-speed input shaft and RPM of the constant-speed input shaft; an electrically powered device including a constant-speed electric motor that rotationally drives the constant-speed input shaft, and a variable-speed electric motor that rotationally drives the variable-speed input shaft; a frequency conversion device that changes a frequency of power to be supplied to the variable-speed electric motor; a first switch that puts the constant-speed electric motor into a power-supplied state or a power-cutoff state; a second switch that puts the variable-speed electric motor into a power-supplied state or a power-cutoff state; and a controller that makes an instruction, to the frequency conversion device, indicating the frequency of the power to be supplied to the variable-speed electric motor, and instructs the first switch and the second switch to be turned on and off. The transmission device includes a sun gear that rotates about an axis, a sun gear shaft that is fixed to the sun gear and extends in an axial direction centered on the axis, a planet gear that meshes with the sun gear, revolves around the axis, and rotates about its own center line, an internal gear that has a plurality of teeth arranged in an annular shape centered on the axis, and meshes with the planet gear, a planet gear carrier that has a planet gear carrier shaft extending in the axial direction centered on the axis, and supports the planet gear so as to allow the planet gear to revolve around the axis and to rotate about its own center line, and an internal gear carrier that has an internal gear carrier shaft extending in the axis direction centered on the axis, and supports the internal gear so as to allows the internal gear to rotate about the axis. The sun gear shaft constitutes the output shaft, the planet gear carrier shaft constitutes the constant-speed input shaft, and the internal gear carrier shaft constitutes the variable-speed input shaft. Upon receiving an instruction to start up, the controller instructs the second switch to be turned on to put the variable-speed electric motor into the power-supplied state, makes an instruction, to the frequency conversion device, indicating a predetermined minimum frequency, and after the variable-speed electric motor has started to be driven at the minimum frequency, instructs the first switch to be turned on to put the constant-speed electric motor into the power-supplied state.

According to this variable electric motor system, the constant-speed electric motor and the variable electric motor system can be controlled to be driven and to be stopped, and the RPM of the variable electric motor system can be controlled as well. Incidentally, according to this variable electric motor system, the RPM of the output shaft when only the variable-speed electric motor is rotated at the minimum RPM will be RPM lower than the RPM range of the output shaft when both the constant-speed electric motor and the variable-speed electric motor are rotating. Accordingly, in this variable electric motor system, at startup, the output shaft is rotated by rotating only the variable-speed electric motor at the minimum RPM, and the startup load torque of the electrically powered device is reduced.

Additionally, a variable electric motor system according to another aspect of the invention includes: a transmission device including an output shaft connected to a driving target, a constant-speed input shaft that is rotated at a constant speed, and a variable-speed input shaft that is rotated at a variable speed, RPM of the output shaft being determined on the basis of RPM of the variable-speed input shaft and RPM of the constant-speed input shaft; an electrically powered device including a constant-speed electric motor that rotationally drives the constant-speed input shaft and a variable-speed electric motor that rotationally drives the variable-speed input shaft; a frequency conversion device that changes a frequency of power to be supplied to the variable-speed electric motor; a first switch that puts the constant-speed electric motor into a power-supplied state or a power-cutoff state; a second switch that puts the variable-speed electric motor into a power-supplied state or a power-cutoff state; and a controller that makes an instruction, to the frequency conversion device, indicating the frequency of the power supplied to the variable-speed electric motor, and instructs the first switch and the second switch to be turned on and off. The transmission device includes: a sun gear that rotates about an axis; a sun gear shaft that is fixed to the sun gear and extends in an axial direction centered on the axis; a planet gear that meshes with the sun gear, revolves around the axis, and rotates about its own center line; an internal gear that has a plurality of teeth arranged in an annular shape centered on the axis, and meshes with the planet gear; a planet gear carrier that has a planet gear carrier shaft extending in the axial direction centered on the axis, and supports the planet gear so as to allow the planet gear to revolve around the axis and to rotate about its own center line; and an internal gear carrier that has an internal gear carrier shaft extending in the axis direction centered on the axis, and supports the internal gear so as to allow the internal gear to rotate about the axis. The sun gear shaft constitutes the output shaft, the planet gear carrier shaft constitutes the constant-speed input shaft, and the internal gear carrier shaft constitutes the variable-speed input shaft. Upon receiving an instruction to start up, the controller instructs the first switch to be turned on to put the constant-speed electric motor into the power-supplied state, after the constant-speed electric motor has started to be driven at predetermined RPM, instructs the second switch to be turned on to put the variable-speed electric motor into the power-supplied state, and makes an instruction, to the frequency conversion device, indicating a predetermined minimum frequency.

According to this variable electric motor system, the constant-speed electric motor, which has a higher output, is started before the variable-speed electric motor. This makes it possible to reduce the load applied to the variable-speed electric motor as compared to a case where the variable-speed electric motor is started first.

In any one of the above-described variable electric motor systems including the controller, the frequency conversion device may be a reversible frequency conversion device capable of changing a direction of a current to be supplied to the variable-speed electric motor. The controller may execute a determination step of determining, upon receiving a change in the RPM of the output shaft, whether or not it is necessary to change the direction of the current to be supplied to the variable-speed electric motor in order to achieve the post-change RPM of the output shaft, a switch off instruction step of, upon determining that it is necessary to change the direction of the current to be supplied to the variable-speed electric motor, instructing the second switch to be turned off to put the variable-speed electric motor into the power-cutoff state, a switch on/current direction change instruction step of, after the variable-speed electric motor has entered the power-cutoff state, instructing the second switch to be turned on to put the variable-speed electric motor into the power-supplied state, and instructing the frequency conversion device to change the direction of the current to be supplied to the variable-speed electric motor, and a target frequency instruction step of, after the variable-speed electric motor has started to be driven in reverse in response to the direction of the current to be supplied to the variable-speed electric motor being changed, instructing a frequency necessary for achieving the post-change RPM of the output shaft as the frequency of the power to be supplied to the variable-speed electric motor.

According to this variable electric motor system, in the case where the direction of the current to be supplied to the variable-speed electric motor is changed and the direction of the rotation of the variable-speed electric motor is changed, the power supplied to the variable-speed electric motor is temporarily interrupted to stop the generation of rotational driving force by the variable-speed electric motor. According to this variable electric motor system, the direction of the current to be supplied to the variable-speed electric motor is then changed, power is supplied to the variable-speed electric motor, and the variable-speed electric motor is rotationally driven. As such, according to this variable electric motor system, sudden loads applied to the variable-speed electric motor can be reduced in the case where the direction of the current to be supplied to the variable-speed electric motor is changed.

Additionally, in the variable electric motor system in which the frequency conversion device is a reversible frequency conversion device, the transmission device may include a brake that restricts rotation of the variable-speed input shaft, and the controller may execute a brake operation instruction step of instructing the brake to restrict the variable-speed input shaft after the variable-speed electric motor has been put into the power-cutoff state in the execution of the switch off instruction step, and instructing the brake to cancel the restriction on the variable-speed input shaft before the variable-speed electric motor is driven in reverse.

According to this variable electric motor system, in the case where the direction of the current to be supplied to the variable-speed electric motor is changed and the direction of the rotation of the variable-speed electric motor is changed, the power supplied to the variable-speed electric motor is temporarily interrupted to stop the generation of rotational driving force by the variable-speed electric motor. According to this variable electric motor system, the rotation of the variable-speed input shaft is then restricted by the brake, and the variable-speed electric motor is stopped. According to this variable electric motor system, the direction of the current to be supplied to the variable-speed electric motor is then changed, power is supplied to the variable-speed electric motor, and the variable-speed electric motor is rotationally driven. As such, according to this variable electric motor system, sudden loads applied to the variable-speed electric motor can be reduced even more in the case where the direction of the current to be supplied to the variable-speed electric motor is changed.

Additionally, in any one of the above-described variable electric motor systems in which the frequency conversion device is a reversible frequency conversion device, the controller may execute a first minimum frequency instruction step of making an instruction, to the frequency conversion device, indicating a predetermined minimum frequency as the frequency of the power to be supplied to the variable-speed electric motor before executing the switch off instruction step in the case of determining in the determination step that it is necessary to change the direction of the current to be supplied to the variable-speed electric motor, and a second minimum frequency instruction step of making an instruction indicating the minimum frequency as the frequency of the power to be supplied to the variable-speed electric motor, after the variable-speed electric motor is put into to the power-cutoff state in the switch off instruction step and before the target frequency instruction step is executed.

According to this variable electric motor system, in the case where the direction of the current to be supplied to the variable-speed electric motor is changed and the direction of the rotation of the variable-speed electric motor is changed, the variable-speed electric motor is set to the minimum RPM, before the power supplied to the variable-speed electric motor is temporarily interrupted to stop the generation of rotational driving force by the variable-speed electric motor. According to this variable electric motor system, the direction of the current to be supplied to the variable-speed electric motor is then changed, power is supplied to the variable-speed electric motor at the minimum frequency, and the variable-speed electric motor is rotationally driven at the minimum RPM. As such, according to this variable electric motor system, sudden loads applied to the variable-speed electric motor can be reduced even more in the case where the direction of the current to be supplied to the variable-speed electric motor is changed.

In any one of the above-described variable electric motor systems, the sun gear shaft may constitute the output shaft, the planet gear carrier shaft may constitute the variable-speed input shaft, and the internal gear carrier shaft may constitute the constant-speed input shaft.

According to this variable electric motor system, the RPM of the output shaft can be increased relative to the RPM of the constant-speed input shaft.

Additionally, in any one of the variable electric motor system, the planet gear carrier may include the planet gear carrier shaft, a carrier main body that supports the planet gear so as to allow the planet gear to revolve around the axis and to rotate about its own center line, and a transmission portion that transmits rotation of the planet gear carrier shaft to the carrier main body. The transmission portion may include a carrier shaft gear formed on an outer peripheral surface of the planet gear carrier shaft, a carrier main body gear formed on an outer peripheral surface of the carrier main body, an idle gear that rotates by meshing with the carrier shaft gear, and a transmission shaft gear that extends in the axial direction and meshes with the idle gear and the carrier main body gear.

According to this variable electric motor system, the components constituting the planet gear carrier are smaller, and thus, the transmission device can be assembled with ease. Additionally, the planet gears and the like that constitute the transmission device are more visible, and thus, maintenance can be carried out with ease.

In any one of the above-described variable electric motor systems, a number of poles in the variable-speed electric motor may be greater than a number of poles in the constant-speed electric motor.

Additionally, in the variable electric motor system, the sun gear shaft and the second rotor may be arranged in the axial direction, the axial direction being horizontal.

Additionally, in the variable electric motor system, the constant-speed electric motor, the variable-speed electric motor, the transmission device, and the driving target may be arranged linearly in that order.

Additionally, in the variable electric motor system, the driving target may be a compressor.

To solve the above-described problems, an electrically powered device according to an aspect of the invention is connected to a transmission device, the transmission device including an output shaft connected to a rotor of a driving target, a constant-speed input shaft that is rotated at a constant speed, and a variable-speed input shaft that is rotated at a variable speed, RPM of the output shaft being determined on the basis of RPM of the variable-speed input shaft and RPM of the constant-speed input shaft. The electrically powered device includes a constant-speed electric motor that rotationally drives the constant-speed input shaft, and a variable-speed electric motor that rotationally drives the variable-speed input shaft. The constant-speed electric motor includes a constant-speed rotor that rotates about an axis and is connected directly or indirectly to the constant-speed input shaft of the transmission device, a constant-speed stator disposed on an outer peripheral side of the constant-speed rotor, and a constant-speed electric motor casing having the constant-speed stator fixed to an inner peripheral side thereof. The variable-speed electric motor includes a variable-speed rotor that rotates about the axis and is connected directly or indirectly to the variable-speed input shaft of the transmission device, a variable-speed stator disposed on an outer peripheral side of the variable-speed rotor, and a variable-speed electric motor casing having the variable-speed stator fixed to an inner peripheral side thereof. Of the variable-speed rotor and the constant-speed rotor, a first rotor has a shaft insertion hole formed therethrough in the axial direction, the shaft insertion hole having a cylindrical shape centered on the axis, and a second rotor is inserted through the shaft insertion hole of the first rotor, the rotor of the driving target is disposed on the axis, and the variable-speed electric motor casing is fixed to the constant-speed electric motor casing.

According to this electrically powered device, the constant-speed rotor of the constant-speed electric motor and the variable-speed rotor of the variable-speed electric motor are disposed on the same axis, which makes it possible to reduce the overall size compared to a case where the constant-speed rotor and the variable-speed rotor are disposed distanced from the axis in the radial direction. Furthermore, according to this electrically powered device, it is not necessary to provide a transmission mechanism such as belts or pulleys, unlike the case where the constant-speed rotor and the variable-speed rotor are disposed distanced from the axis in the radial direction. This configuration allows for a reduction in size of the device and, furthermore, allows for a reduction in the number of components, which makes it possible to reduce manufacturing costs. Additionally, according to this electrically powered device, it is not necessary to provide a transmission mechanism such as belts or pulleys as described above. This configuration prevents flexural loads from being applied to the shafts located on the axis from such belts or the like, which makes it possible to reduce vibrations as well.

According to this electrically powered device, the variable-speed electric motor casing is fixed to the constant-speed electric motor casing. As such, according to this electrically powered device, the variable-speed rotor can be positioned (centered) accurately relative to the constant-speed rotor before the electrically powered device is shipped from the factory. Thus according to this electrically powered device, operations for positioning the variable-speed rotor relative to the constant-speed rotor need not be carried out at the site where the system is installed.

Additionally, the electrically powered device may further include a cooling fan attached to an end of the second rotor remote from the transmission device, and the constant-speed electric motor casing and the variable-speed electric motor casing may communicate with each other so that a gas flow is produced within the constant-speed electric motor casing and within the variable-speed electric motor casing by the cooling fan rotating.

According to this electrically powered device, the cooling fan provided at the end of the second rotor rotates as the second rotor rotates. The rotation of the cooling fan causes air to flow into one of the constant-speed electric motor casing and the variable-speed electric motor casing from the outside and to cool the rotor, stator, and the like in the one casing. Furthermore, according to this electrically powered device, the constant-speed electric motor casing and the variable-speed electric motor casing communicate with each other, and thus the air flowing into the one casing also flows into the other casing and cools the rotor, stator, and the like in the other casing. Thus according to this variable electric motor system, the two electric motors can be cooled by the single cooling fan. This configuration allows for a reduction in size of the device and allows for a reduction in manufacturing cost.

Advantageous Effects of Invention

An aspect of the present invention allows for a reduction in size of the device and a reduction in manufacturing cost.

DESCRIPTION OF EMBODIMENTS

Several embodiments of a variable electric motor system according to the present invention and variations on the embodiments will be described in detail below with reference to the drawings.

First Embodiment

A first embodiment of the variable electric motor system according to the present invention will be described with reference to FIGS. 1 to 5.

Figure 1:
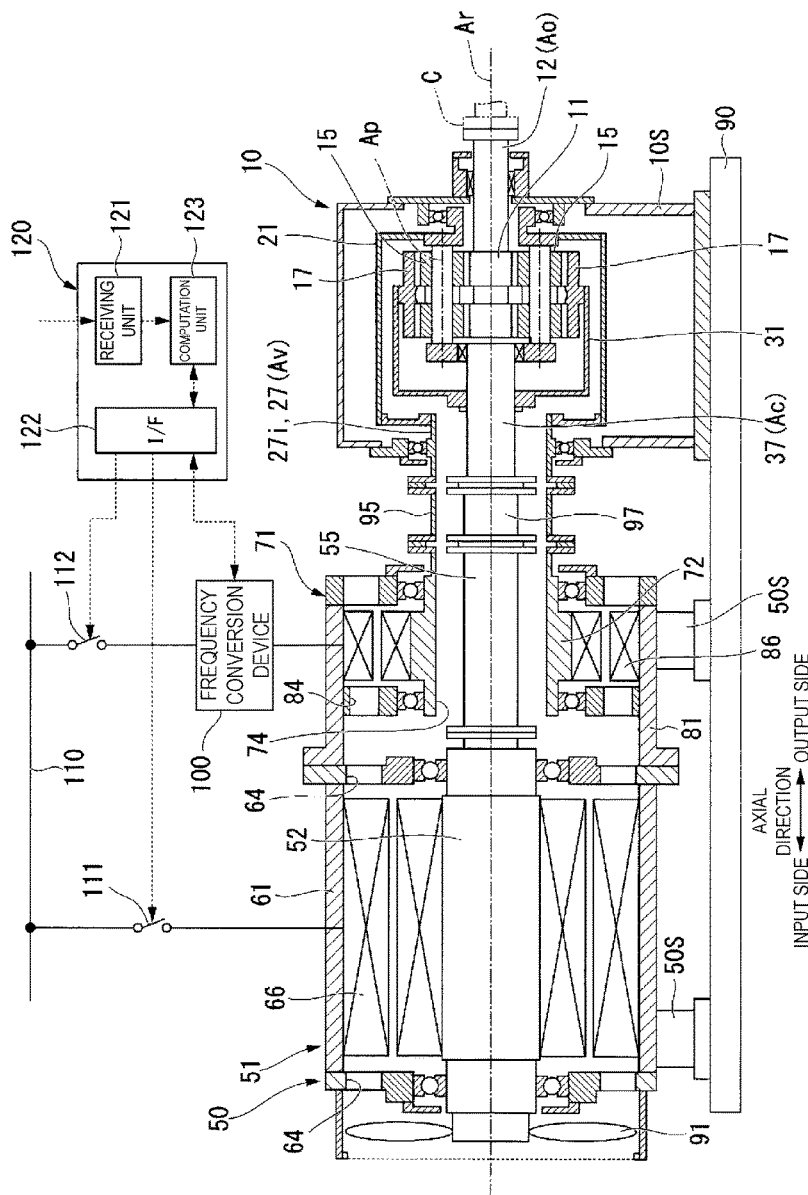
FIG. 1 is a cross-sectional view of a variable electric motor system according to a first embodiment of the present invention.

As illustrated in FIG. 1, the variable electric motor system according to the present embodiment includes an electrically powered motor device 50 that generates rotational driving force and a transmission device 10 that changes the speed of the rotational driving force generated by the electrically powered device 50 and transmits that force to a driving target. The variable electric motor system can be applied to, for example, a fluid machinery system such as a compressor system. Additionally, the variable electric motor system is used at high RPM of 5,000 rpm to 20,000 rpm, for example. Accordingly, factors that cause vibrations, such as slight errors in alignment, can lead to large vibrations.

The electrically powered device 50 is supported on a frame 90 (a predetermined structure) by an electrically powered device support portion 50S. The transmission device 10 is supported on the frame 90 by a transmission device support portion 10S. The electrically powered device 50 and the transmission device 10, which are heavy objects, can be securely fixed by using these support portions.

Note that the frame 90 may be divided for the electrically powered device 50, the transmission device 10, and a compressor C, or may be integrated as any combination thereof.

Figure 2:
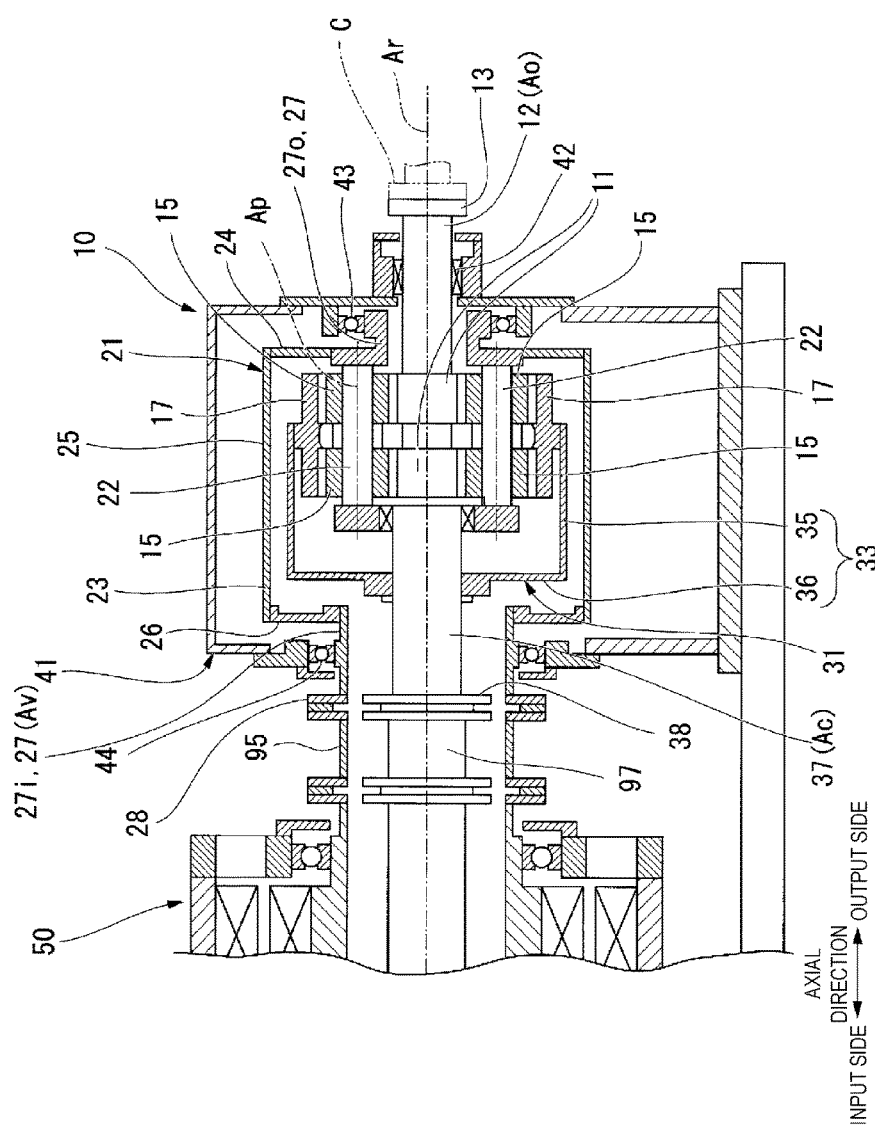
FIG. 2 is a cross-sectional view of a transmission device according to the first embodiment of the present invention.

The transmission device 10 is a planet gear transmission device. As illustrated in FIG. 2, the transmission device 10 includes a sun gear 11 that rotates about an axis Ar extending in a horizontal direction, a sun gear shaft 12 fixed to the sun gear 11, a plurality of planet gears 15 that revolve around the axis Ar, that rotate about their own center lines Ap, and that mesh with the sun gear 11, an internal gear 17 in which a plurality of teeth are arranged in an annular shape around the axis Ar and that meshes with the plurality of planet gears 15, a planet gear carrier 21 that supports the plurality of planet gears 15 so as to allow the plurality of planet gears 15 to revolve around the axis Ar and to rotate about their own center lines Ap, an internal gear carrier 31 that supports the internal gear 17 so as to allow the internal gear 17 to rotate about the axis Ar, and a transmission casing 41 that houses these elements.

Here, a direction in which the axis Ar extends is defined as an axial direction, with one side in the axial direction defined as an output side and a side opposite to the output side defined as an input side. Additionally, a radial direction around the axis Ar will be called simply a "radial direction" hereinafter.

The sun gear shaft 12 has a circular column shape centered on the axis Ar, and extends from the sun gear 11 toward the output side in the axial direction. A flange 13 is formed at an output-side end of the sun gear shaft 12. For example, a rotor of the compressor C, which serves as the driving target, is connected to the flange 13. The sun gear shaft 12 is rotatably supported about the axis Ar by a sun gear bearing 42 disposed on the output side of the sun gear 11. The sun gear bearing 42 is attached to the transmission casing 41.

The planet gear carrier 21 includes a planet gear shaft 22 provided for each of the plurality of planet gears 15, a carrier main body 23 that fixes the relative positions of the plurality of planet gear shafts 22, and a planet gear carrier shaft 27 that is fixed to the carrier main body 23 and extends in the axial direction centered on the axis Ar.

The planet gear shaft 22 passes through the planet gear(s) 15 along the center line Ap in the axial direction, and supports the planet gears 15 so as to allow the planet gears 15 to rotate about its center line. The carrier main body 23 includes an output-side arm portion 24 extending outward in the radial direction from the plurality of planet gear shafts 22, a cylindrical portion 25 that has a cylindrical shape centered on the axis Ar and that extends toward the input side from the outer end in the radial direction of the output-side arm portion 24, and an input-side arm portion 26 that extends inward in the radial direction from the input-side end of the cylindrical portion 25.

An output-side planet gear carrier shaft 27o extending toward the output side from the output-side arm portion 24 and an input-side planet gear carrier shaft 27i extending toward the input side from the input-side arm portion 26 are provided as the planet gear carrier shaft 27. The planet gear carrier shafts 27o and 27i both have cylindrical shapes centered on the axis Ar. The output-side planet gear carrier shaft 27o is rotatably supported about the axis Ar by a planet gear carrier bearing 43 disposed on the output side beyond the output-side arm portion 24. The planet gear carrier bearing 43 is attached to the transmission casing 41. The sun gear shaft 12 is inserted through the inner peripheral side of the output-side planet gear carrier shaft 27o. The input-side planet gear carrier shaft 27i is rotatably supported about the axis Ar by a planet gear carrier bearing 44 disposed on the input side beyond the input-side arm portion 26. The planet gear carrier bearing 44 is attached to the transmission casing 41. A flange 28 having an annular shape that extends outward in the radial direction is formed at the input-side end of the input-side planet gear carrier shaft 27i.

The internal gear carrier 31 includes a carrier main body 33 to which the internal gear 17 is fixed and an internal gear carrier shaft 37 that is fixed to the carrier main body 33 and extends in the axial direction centered on the axis Ar.

The carrier main body 33 includes a cylindrical portion 35 that has a cylindrical shape centered on the axis Ar and that has the internal gear 17 fixed to the inner peripheral side thereof, and an input-side arm portion 36 that extends inward in the radial direction from the input-side end of the cylindrical portion 35.

The internal gear carrier shaft 37 has a circular column shape centered on the axis Ar and is disposed on the input side of the sun gear shaft 12, which also has a circular column shape centered on the axis Ar. The internal gear carrier shaft 37 is fixed to the input-side arm portion 36 of the carrier main body 33. A flange 38 having an annular shape or a disk shape that extends outward in the radial direction is formed at the input-side end of the internal gear carrier shaft 37. A portion on the input side of the internal gear carrier shaft 37 is inserted through the inner peripheral side of the cylindrical input-side planet gear carrier shaft 27i. The flange 38 of the internal gear carrier shaft 37 and the flange 28 of the input-side planet gear carrier shaft 27i have substantially the same position in the axial direction.

Figure 3:
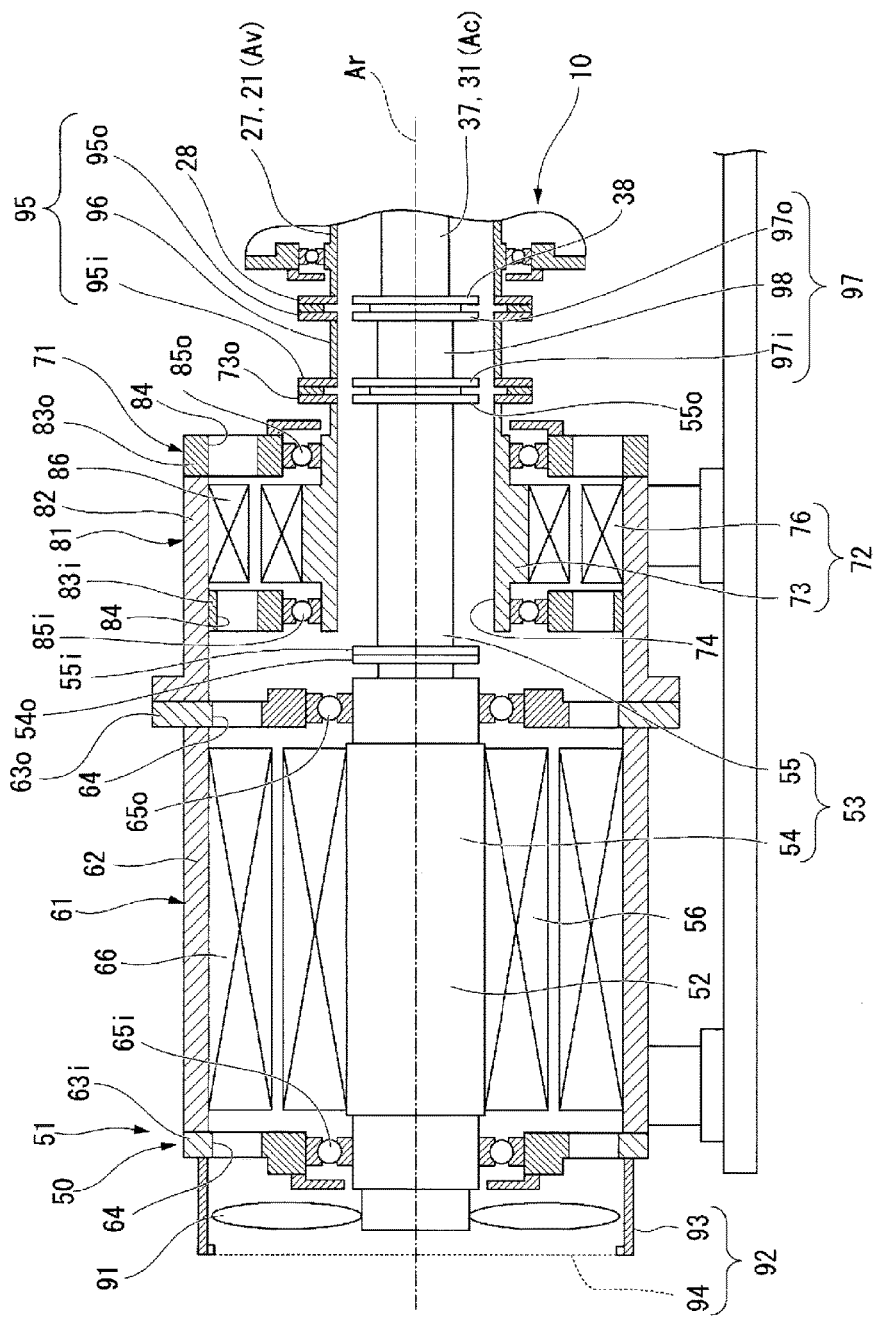
FIG. 3 is a cross-sectional view of an electrically powered motor device according to the first embodiment of the present invention.

As illustrated in FIG. 3, the electrically powered device 50 includes a constant-speed electric motor 51 that rotationally drives the internal gear carrier shaft 37 serving as a constant-speed input shaft Ac, a variable-speed electric motor 71 that rotationally drives the input-side planet gear carrier shaft 27i serving as a variable-speed input shaft Av, a cooling fan 91 for cooling these motors, and a fan cover 92 that covers the cooling fan 91.

In the present embodiment, the constant-speed electric motor 51 is, for example, a four-pole induction motor. The variable-speed electric motor 71 is an induction motor having a greater number of poles than the constant-speed electric motor 51, namely 12 poles.

The constant-speed electric motor 51 includes a constant-speed rotor 52 that rotates about the axis Ar and is connected to the internal gear carrier shaft 37 serving as the constant-speed input shaft Ac, a constant-speed stator 66 disposed on the outer peripheral side of the constant-speed rotor 52, and a constant-speed electric motor casing 61 having the constant-speed stator 66 fixed to the inner peripheral side thereof.

The constant-speed rotor 52 includes a constant-speed rotor shaft 53 and a conductor 56 fixed to the outer periphery of the constant-speed rotor shaft 53. The constant-speed rotor shaft 53 includes a constant-speed rotor main body shaft 54 that has a circular column shape centered on the axis Ar and that has the conductor 56 fixed to the outer periphery thereof, and a constant-speed rotor extension shaft 55 that has a circular column shape centered on the axis Ar and that is fixed to the output side of the constant-speed rotor main body shaft 54. Flanges 55i and 55o each having an annular shape or a disk shape that extends outward in the radial direction are formed at both the ends of the constant-speed rotor extension shaft 55 in the axial direction. A flange 54o having an annular shape or a disk shape that extends outward in the radial direction is formed at the output-side end of the constant-speed rotor main body shaft 54. The constant-speed rotor extension shaft 55 and the constant-speed rotor main body shaft 54 are integrated by the flanges 55i, 55o, and 54o being connected to each other with bolts or the like. The above-described cooling fan 91 is fixed to the input-side end of the constant-speed rotor main body shaft 54.

The constant-speed stator 66 is disposed outward from the conductor 56 of the constant-speed rotor 52 in the radial direction. The constant-speed stator 66 is formed from a plurality of coils.

The constant-speed electric motor casing 61 includes a casing main body 62 that has a cylindrical shape centered on the axis Ar and that has the constant-speed stator 66 fixed to the inner peripheral side thereof, and caps 63i and 63o that close both the ends of the cylindrical casing main body 62 in the axial direction. Constant-speed rotor bearings 65i and 65o are attached to the caps 63i and 63o, respectively. The constant-speed rotor bearings 65i and 65o support the constant-speed rotor main body shaft 54 so as to allow the constant-speed rotor main body shaft 54 to rotate about the axis Ar. Additionally, a plurality of openings 64 are formed through the caps 63i and 63o in the axial direction, the openings 64 being positioned on the outer side in the radial direction beyond the constant-speed rotor bearings 65i and 65o.

The input-side end of the constant-speed rotor main body shaft 54 projects toward the input side from the cap 63i on the input side of the constant-speed electric motor casing 61. The above-described cooling fan 91 is fixed to the input-side end of the constant-speed rotor main body shaft 54. As such, when the constant-speed rotor 52 rotates, the cooling fan 91 also rotates integrally with the constant-speed rotor 52. The fan cover 92 includes a cylindrical cover main body 93 disposed on the outer peripheral side of the cooling fan 91, and an air-permeable plate 94 that is attached to an inlet-side opening of the cover main body 93 and that has a plurality of air holes formed therethrough. The fan cover 92 is fixed to the cap 63i on the input side of the constant-speed electric motor casing 61.

The variable-speed electric motor 71 includes a variable-speed rotor 72 that rotates about the axis Ar and that is connected to the input-side planet gear carrier shaft 27i serving as the variable-speed input shaft Av, a variable-speed stator 86 disposed on the outer peripheral side of the variable-speed rotor 72, and a variable-speed electric motor casing 81 having the variable-speed stator 86 fixed to the inner peripheral side thereof.

The variable-speed rotor 72 includes a variable-speed rotor shaft 73 and a conductor 76 fixed to the outer periphery of the constant-speed rotor shaft 53. The variable-speed rotor shaft 73 has a shaft insertion hole 74 formed therethrough in the axial direction, the shaft insertion hole 74 having a cylindrical shape centered on the axis Ar. The constant-speed rotor extension shaft 55 is inserted through the shaft insertion hole 74 of the variable-speed rotor shaft 73. A flange 73o having an annular shape that extends outward in the radial direction is formed at the output-side end of the variable-speed rotor shaft 73. The flange 73o of the variable-speed rotor shaft 73 and the flange 55o formed at the output-side end of the constant-speed rotor extension shaft 55 have substantially the same position in the axial direction.

In the present embodiment, the variable-speed rotor 72 through which the shaft insertion hole 74 is formed constitutes a first rotor, and the constant-speed rotor 52 inserted through the shaft insertion hole 74 constitutes a second rotor.

The variable-speed stator 86 is disposed on the outer side of the conductors 56 and 76 of the variable-speed rotor 72 in the radial direction. The variable-speed stator 86 is formed from a plurality of coils.

The variable-speed electric motor casing 81 includes a casing main body 82 that has a cylindrical shape centered on the axis Ar and that has the variable-speed stator 86 fixed to the inner peripheral side thereof, an output-side cap 83o that closes the output-side end of the cylindrical casing main body 82, and an input-side cap 83i that is disposed on the input side beyond the variable-speed stator 86 and that is fixed to the inner peripheral side of the cylindrical casing main body 82. Variable-speed rotor bearings 85i and 85o are attached to the caps 83i and 83o, respectively. The variable-speed rotor bearings 85i and 85o support the variable-speed rotor shaft 73 so as to allow the variable-speed rotor shaft 73 to rotate about the axis Ar. Additionally, a plurality of openings 84 are formed through the caps 83i and 83o in the axial direction, the openings 84 being positioned on the outer side in the radial direction beyond the constant-speed rotor bearings 85i and 85o.

The plurality of openings 84 formed through the caps 83i and 83o of the variable-speed electric motor casing 81 and the plurality of openings 64 formed through the caps 63i and 63o of the constant-speed electric motor casing 61 as described above cause a space within the variable-speed electric motor casing 81 to communicate with a space within the constant-speed electric motor casing 61.

Additionally, in the variable electric motor system according to the present embodiment, the constant-speed rotor 52, the variable-speed rotor 72, and the sun gear shaft 12 are disposed on the same axis.

The variable electric motor system according to the present embodiment further includes a variable-speed flexible coupling 95 disposed between the input-side planet gear carrier shaft 27i serving as the variable-speed input shaft Av and the variable-speed rotor 72 so as to connect the input-side planet gear carrier shaft 27i and the variable-speed rotor 72, and a constant-speed flexible coupling 97 disposed between the internal gear carrier shaft 37 serving as the constant-speed input shaft Ac and the constant-speed rotor 52 so as to connect the internal gear carrier shaft 37 and the constant-speed rotor 52.

The variable-speed flexible coupling 95 includes a cylindrical portion 96 that has a cylindrical shape and that is flexible in at least directions perpendicular to the center axis Ar of the cylinder, and annular flanges 95i and 95o provided on both sides of the cylindrical portion 96.

The constant-speed flexible coupling 97 includes a cylindrical portion 98 that has a cylindrical shape or a circular column shape and that is flexible in at least directions perpendicular to the center axis Ar of the cylinder or circular column, and annular or disk-shaped flanges 97i and 97o provided on both sides of the cylindrical portion 98.

The variable-speed flexible coupling 95 is disposed on the outer peripheral side of the constant-speed flexible coupling 97. A length dimension of the constant-speed flexible coupling 97 in the axial direction and a length dimension of the variable-speed flexible coupling 95 in the axial direction are the same.

Outer diameter dimensions of the flanges 95i and 95o of the variable-speed flexible coupling 95, an outer diameter dimension of the flange 28 of the planet gear carrier 21, and an outer diameter dimension of the flange 73o of the variable-speed rotor 72 are the same. Accordingly, the above-described flanges 28, 73o, 95i, and 95o face each other in the axial direction. As such, the flange 28 of the planet gear carrier 21 and the flange 73o of the variable-speed rotor 72 can be connected via a typical flexible coupling.

The output-side flange 95o of the variable-speed flexible coupling 95 and the flange 28 of the planet gear carrier 21 are connected to each other by using bolts or the like. Likewise, the input-side flange 95i of the variable-speed flexible coupling 95 and the flange 73o of the variable-speed rotor 72 are connected to each other by using bolts or the like.

Outer diameter dimensions of the flanges 97i and 97o of the constant-speed flexible coupling 97, an outer diameter dimension of the flange 38 of the internal gear carrier 31, and an outer diameter dimension of the output side flange 55o of the constant-speed rotor extension shaft 55 are the same. Accordingly, the above-described flanges 38, 55o, 97i, and 97o also face each other in the axial direction. As such, the flange 38 of the internal gear carrier 31 and the output-side flange 55o of the constant-speed rotor extension shaft 55 can be connected via a typical flexible coupling.

The output-side flange 97o of the constant-speed flexible coupling 97 and the flange 38 of the internal gear carrier 31 are connected to each other by using bolts or the like. Likewise, the input-side flange 97i of the constant-speed flexible coupling 97 and the output-side flange 55o of the constant-speed rotor extension shaft 55 are connected to each other by using bolts or the like.

The above describes both the cylindrical portion 96 of the variable-speed flexible coupling 95 and the cylindrical portion 98 of the constant-speed flexible coupling 97 as being flexible in at least the directions perpendicular to the center axis Ar of the cylinder or circular column. However, the cylindrical portions 96 and 98 of these flexible couplings 95 and 97 need not be flexible as long as the output sides of the cylindrical portions are movable relative to the input sides thereof in at least the directions perpendicular to the center axis Ar of the cylinder or circular column.

Additionally, in the present embodiment, the variable-speed flexible coupling 95 connected to the variable-speed rotor 72 serving as the first rotor constitutes a first flexible coupling, and the constant-speed flexible coupling 97 connected to the constant-speed rotor 52 serving as the second rotor constitutes a second flexible coupling.

Furthermore, in the present embodiment, the variable-speed input shaft Av, which is connected to the variable-speed rotor 72 serving as the first rotor via the variable-speed flexible coupling 95 serving as the first flexible coupling, constitutes a first input shaft. Additionally, in the present embodiment, the constant-speed input shaft Ac, which is connected to the constant-speed rotor 52 serving as the second rotor via the constant-speed flexible coupling 97 serving as the second flexible coupling, constitutes a second input shaft. Accordingly, the flange 73o of the variable-speed rotor 72 serving as the first rotor constitutes a rotor-side connecting portion, and the flange 28 of the variable-speed input shaft Av serving as the first input shaft constitutes a transmission device-side connecting portion.

Additionally, in the present embodiment, the constant-speed rotor shaft 53 (constant-speed rotor extension shaft 55) is inserted through the shaft insertion hole 74 of the variable-speed rotor shaft 73, and the constant-speed electric motor 51, the variable-speed electric motor 71, the transmission device, and the compressor C are arranged linearly in that order from the left side in FIG. 1.

As illustrated in FIG. 1, the variable electric motor system according to the present embodiment further includes a frequency conversion device 100 that changes the frequency of power to be supplied to the variable-speed electric motor 71, a first switch 111 that puts the constant-speed electric motor 51 into a power-supplied state or a power-cutoff state, a second switch 112 that puts the variable-speed electric motor 71 into a power-supplied state or a power-cutoff state, and a controller 120 that controls the operations of the frequency conversion device 100, the first switch 111, and the second switch 112.

The first switch 111 is electrically connected to a power source line 110 and the constant-speed electric motor 51. The second switch 112 is electrically connected to the power source line 110 and the frequency conversion device 100. The frequency conversion device 100 is electrically connected to the variable-speed electric motor 71.

The controller 120 is constituted of a computer. The controller 120 includes a receiving unit 121 that receives an instruction directly from an operator or receives an instruction from a host control device, an interface 122 that provides instructions to the first switch 111, the second switch 112, and the frequency conversion device 100, and a computation unit 123 that creates instructions for the first switch 111, the second switch 112, and the frequency conversion device 100 in response to the instructions received by the receiving unit 121 or the like.

The first switch 111 is turned on in response to an on instruction from the controller 120, and is turned off in response to an off instruction from the controller 120. When the first switch 111 is turned on, power from the power source line 110 is supplied to the constant-speed electric motor 51, putting the constant-speed electric motor 51 into the power-supplied state. When the first switch 111 is turned off, the supply of power from the power source line 110 to the constant-speed electric motor 51 is cut off, putting the constant-speed electric motor 51 into the power-cutoff state.

The second switch 112 is turned on in response to an on instruction from the controller 120, and is turned off in response to an off instruction from the controller 120. When the second switch 112 is turned on, power from the power source line 110 is supplied to the variable-speed electric motor 71 via the frequency conversion device 100, putting the variable-speed electric motor 71 into the power-supplied state. When the second switch 112 is turned off, the supply of power from the power source line 110 to the frequency conversion device 100 and the variable-speed electric motor 71 is cut off, putting the variable-speed electric motor 71 into the power-cutoff state.

The frequency conversion device 100 supplies power to the variable-speed electric motor 71 at a frequency instructed by the controller 120. The variable-speed rotor 72 of the variable-speed electric motor 71 rotates at RPM corresponding to this frequency. Because the RPM of the variable-speed rotor 72 changes in this manner, the RPM of the planet gear carrier 21 in the transmission device 10 connected to the variable-speed rotor 72 also changes. The RPM of the sun gear shaft 12, which serves as an output shaft Ao of the transmission device 10, also changes as a result.

Figure 4:
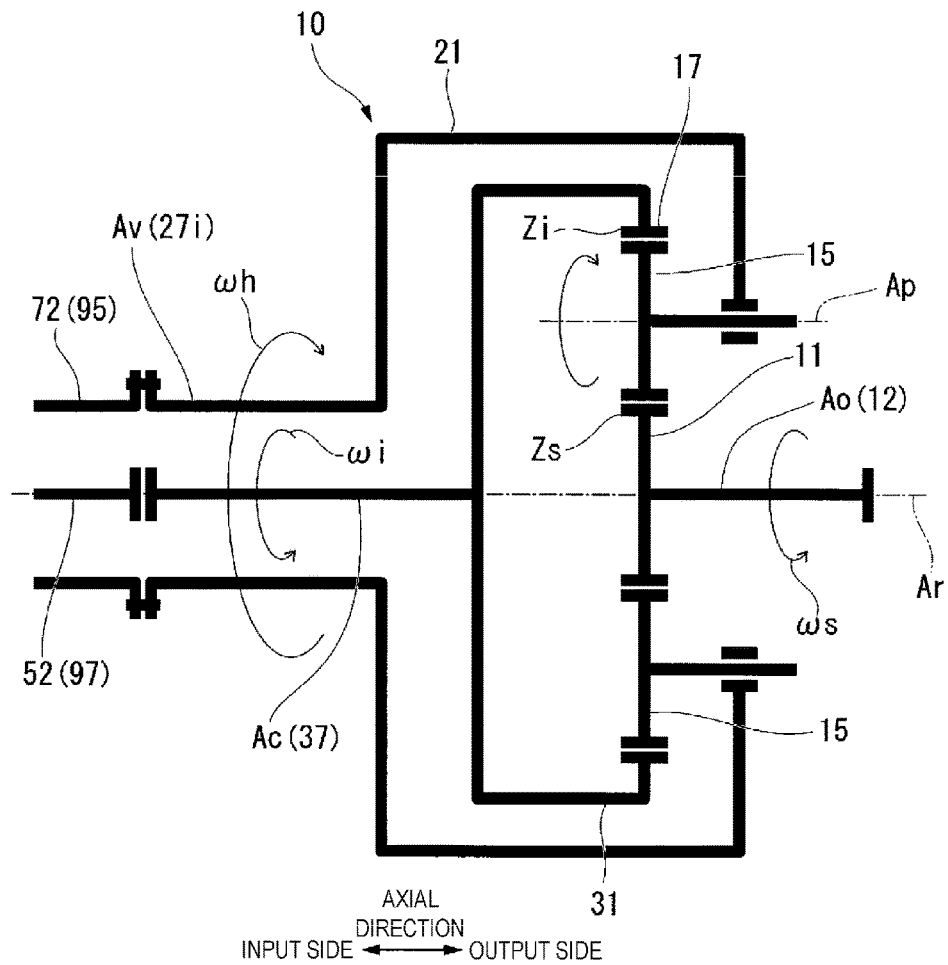
FIG. 4 is a schematic view illustrating the configuration of the transmission device according to the first embodiment of the present invention.

Relationships between the number of teeth in each gear of the transmission device 10 and the RPM of each shaft in the transmission device 10 will be described below with reference to FIG. 4.

Assume that the RPM of the sun gear shaft 12 serving as the output shaft Ao is represented by ωs, the RPM of the internal gear carrier shaft 37 serving as the constant-speed input shaft Ac is represented by and the RPM of the input side planet gear carrier shaft 27i serving as the variable-speed input shaft Av is represented by ωh. Furthermore, assume that the number of teeth in the sun gear 11 is represented by Zs and the number of teeth in the internal gear 17 is represented by Zi.

In this case, the relationship between the number of teeth in each gear and the RPM of each shaft in the transmission device 10 can be expressed by the following Formula (1):

$$\omega s/\omega i = \omega h/\omega i - (1-\omega h/\omega i) \times Zi/Zs \qquad (1).$$

In the case where, for example, the constant-speed electric motor 51 is a four-pole induction motor as described above and a power source frequency is 50 Hz, the RPM of the constant-speed rotor 52 and the RPM ωi of the constant-speed input shaft Ac are 1,500 rpm. In the case where the variable-speed electric motor 71 is a 12-pole induction motor as described above and the power source frequency is 50 Hz, maximum RPM of the variable-speed rotor 72 and maximum RPM ωh of the variable-speed input shaft Av are 500 rpm. Additionally, it is assumed that a ratio between the number of teeth Zs in the sun gear 11 and the number of teeth Zi in the internal gear 17, or Zi/Zs, is 8, for example.

In this case, assuming the constant-speed rotor 52 rotates in a forward direction and the variable-speed rotor 72 rotates in a direction opposite to the rotation direction of the constant-speed rotor 52 at the maximum RPM (−500 rpm), the RPM of the output shaft Ao will be −16,500 rpm.

Assuming the constant-speed rotor 52 rotates in the forward direction and the variable-speed rotor 72 rotates in the same direction as the constant-speed rotor 52 at the maximum RPM (+500 rpm), the RPM of the output shaft Ao will be −7,500 rpm.

Assuming the constant-speed rotor 52 rotates in the forward direction and the RPM of the variable-speed rotor 72 is 0 rpm, the RPM of the output shaft Ao will be −12,000 rpm.

Assuming the constant-speed rotor 52 rotates in the forward direction and the variable-speed rotor 72 rotates in a direction opposite to the rotation direction of the constant-speed rotor 52 at minimum RPM (−50 rpm), the RPM of the output shaft Ao will be −12,450 rpm.

Assuming the constant-speed rotor 52 rotates in the forward direction and the variable-speed rotor 72 rotates in the same direction as the constant-speed rotor 52 at the minimum RPM (+50 rpm), the RPM of the output shaft Ao will be −11,550 rpm.

As such, for example, in the case where the RPM of the constant-speed rotor 52 is +1,500 rpm and the RPM of the variable-speed rotor 72 can be controlled in a range of −50 to −500 rpm through the frequency control carried out by the frequency conversion device 100, or in other words, in the case where the frequency of the power to be supplied to the variable-speed electric motor 71 can be controlled in a range of 5 to 50 Hz, the RPM of the output shaft Ao can be controlled in a range of −12,450 to −16,500 rpm.

Figure 5:
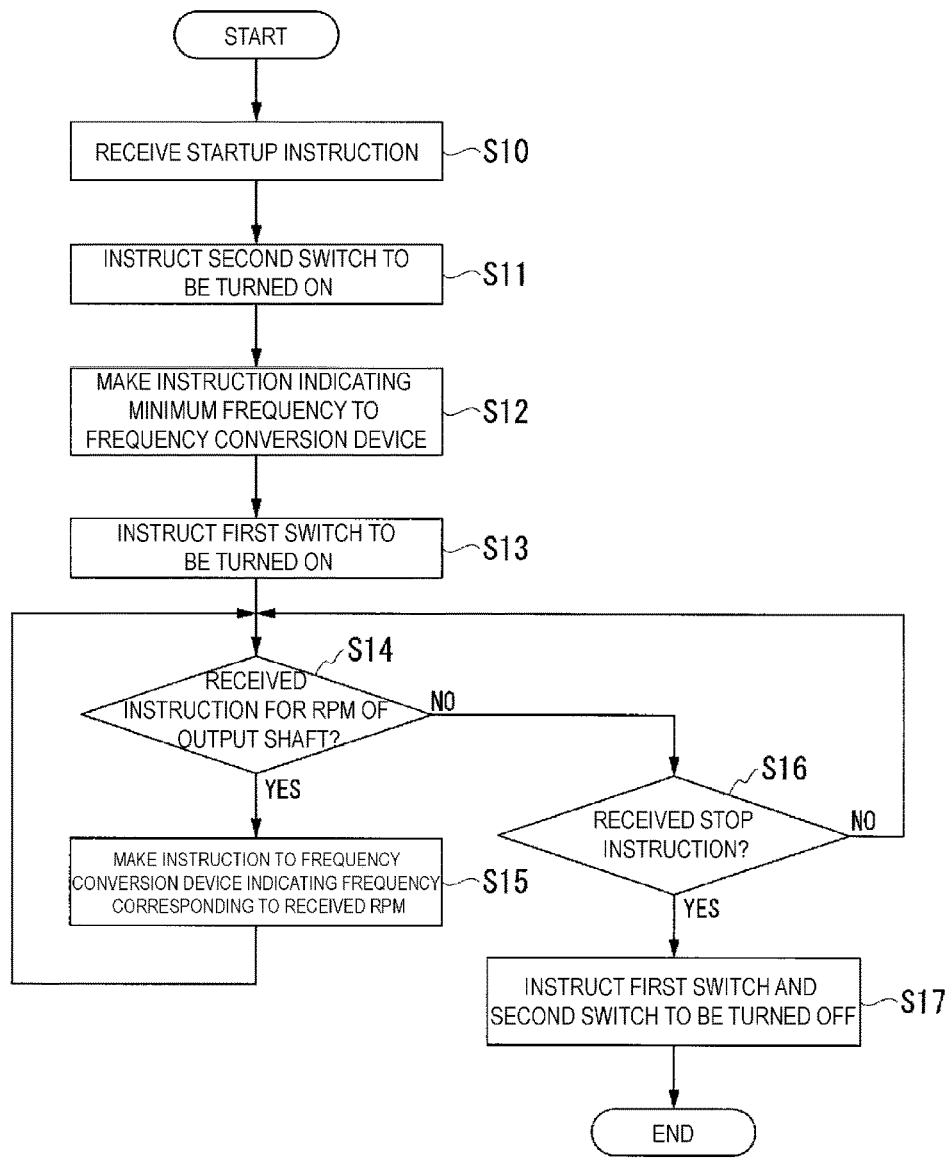
FIG. 5 is a flowchart illustrating operations of a controller according to the first embodiment of the present invention.

Next, operations of the variable electric motor system according to the present embodiment, from when the system is started to when the system is stopped, will be described according to the flowchart illustrated in FIG. 5.

Upon receiving an instruction from the outside to start the variable electric motor system (S10), the controller 120 outputs the on instruction to the second switch 112 (S11) and makes an instruction indicating the minimum frequency to the frequency conversion device 100 (S12). Here, the minimum frequency is a minimum frequency that can be set by the frequency conversion device 100 or a minimum frequency preset by an operator or the like. The minimum frequency is assumed here to be ¹⁄₁₀ the power source frequency of 50 Hz, or in other words, 5 Hz, for example.

Upon receiving the on instruction from the controller 120, the second switch 112 is turned on, and the power from the power source line 110 is supplied to the frequency conversion device 100. Upon receiving the minimum frequency as the instructed frequency value from the controller 120, the frequency conversion device 100 converts the frequency of the power from the power source line 110 to the minimum frequency and supplies that power to the variable-speed electric motor 71. As a result, the variable-speed electric motor 71 enters the power-supplied state in which power is being supplied at the minimum frequency. In the case where the variable-speed electric motor 71 according to the present embodiment has received power at the same frequency as the power source frequency (a maximum frequency: 50 Hz), the RPM thereof will be the maximum RPM of 500 rpm, as described above. Accordingly, in the case where power at ¹⁄₁₀ the power source frequency, or in other words, at the minimum frequency of 5 Hz, has been received, the RPM of the variable-speed electric motor 71 will be the minimum RPM of 50 rpm, as described above. Note that it is assumed here that the rotation direction of the variable-speed electric motor 71 is opposite to the rotation direction of the constant-speed electric motor 51. Accordingly, the RPM of the variable-speed electric motor 71 will be −50 rpm when the constant-speed electric motor 51 rotates in the forward direction.

In the case where the constant-speed electric motor 51 is not rotating and the RPM of the constant-speed electric motor 51 and the RPM of the constant-speed input shaft Ac connected thereto are 0 rpm, the relationship between the number of teeth in each gear of the transmission device 10 and the RPM of each shaft in the transmission device 10 can be expressed by the following Formula (2):

$$\omega s/\omega h = Zi/Zs + 1 \qquad (2).$$

Like the case described above, assuming the ratio Zi/Zs between the number of teeth Zs in the sun gear 11 and the number of teeth Zi in the internal gear 17 is 8, the RPM ωs of the output shaft Ao will be −450 rpm when the RPM of the variable-speed electric motor 71 and the RPM ωh of the variable-speed input shaft Av connected thereto is the minimum RPM of −50 rpm.

In this manner, when the constant-speed electric motor 51 is not rotating, the RPM ωs of the output shaft Ao when only the variable-speed electric motor 71 is rotated at the minimum RPM will be extremely low RPM as compared to the range of the RPM ωs of the output shaft Ao when both the constant-speed electric motor 51 and the variable-speed electric motor 71 are rotating (−12,450 to −16,500 rpm).

Accordingly, in the present embodiment, a startup load torque of the electrically powered device 50 can be reduced even in the case where the driving target connected to the output shaft Ao is, for example, the compressor C and the GD² thereof is high.

The controller 120 outputs the on instruction to the first switch 111 upon the variable-speed rotor 72 of the variable-speed electric motor 71 starting to rotate and the output shaft Ao starting to rotate (S13).

Upon receiving the on instruction from the controller 120, the first switch 111 is turned on, the power from the power source line 110 is supplied to the constant-speed electric motor 51, and the constant-speed electric motor 51 enters the power-supplied state. In the case where the constant-speed electric motor 51 according to the present embodiment has received power from the power source line 110, the RPM thereof will be 1,500 rpm, for example.

In the case where the RPM of the constant-speed electric motor 51 and the RPM of the constant-speed input shaft Ac connected thereto is 1,500 rpm and the RPM of the variable-speed electric motor 71 and the RPM of the variable-speed input shaft Av connected thereto is the minimum of 50 rpm (the rotation direction is opposite to the rotation direction of the constant-speed input shaft Ac, however), the RPM of the output shaft Ao will be, for example, the minimum controllable RPM of 12,450 rpm (the rotation direction is opposite to the rotation direction of the constant-speed input shaft Ac, however).

Thereafter, the controller 120 stands by to receive an instruction of target RPM of the output shaft Ao (S14) or a stop instruction (S16). Upon receiving the instruction of the target RPM, the controller 120 makes an instruction indicating a frequency corresponding to the received target RPM to the frequency conversion device 100 (S15).

Upon receiving this instruction, the frequency conversion device 100 supplies power to the variable-speed electric motor 71 at the frequency corresponding to the received target RPM. The RPM of the variable-speed electric motor 71 and the RPM of the variable-speed input shaft Av connected thereto becomes RPM corresponding to the target RPM of the output shaft Ao (−50 to −500 rpm), and as a result, the RPM of the output shaft Ao becomes the target RPM (−12,450 to −16,500 rpm).

After making the instruction indicating the frequency corresponding to the received target RPM to the frequency conversion device 100 (S15), the controller 120 once again enters the stand-by state for receiving the instruction of the target RPM of the output shaft Ao (S14) or the stop instruction (S16). Upon receiving the stop instruction in this state, the controller 120 outputs the off instruction to the first switch 111 and the second switch 112 (S17).

Upon receiving the off instruction from the controller 120, both the first switch 111 and the second switch 112 are turned off. Accordingly, power is no longer supplied to the constant-speed electric motor 51 and the variable-speed electric motor 71 from the power source line 110, and both the constant-speed electric motor 51 and the variable-speed electric motor 71 enter the power-cutoff state. The output shaft Ao stops as a result.

As described thus far, according to the present embodiment, the startup load torque of the electrically powered device 50 can be reduced.

Additionally, according to the present embodiment, the constant-speed rotor 52 of the constant-speed electric motor 51 and the variable-speed rotor 72 of the variable-speed electric motor 71 are disposed on the axis Ar of the transmission device 10, which makes it possible to reduce the overall size compared to a case where the constant-speed rotor 52 and the variable-speed rotor 72 are disposed distanced from the axis Ar of the transmission device 10 in the radial direction. Furthermore, according to the present embodiment, it is not necessary to provide a transmission mechanism such as belts or pulleys, unlike the case where the constant-speed rotor 52 and the variable-speed rotor 72 are disposed distanced from the axis Ar of the transmission device 10 in the radial direction. This configuration allows for a reduction in size of the device and, furthermore, allows for a reduction in the number of components, which makes it possible to reduce manufacturing costs. Additionally, according to the present embodiment, it is not necessary to provide a transmission mechanism such as belts or pulleys, unlike the case where the constant-speed rotor 52 and the variable-speed rotor 72 are disposed distanced from the axis Ar of the transmission device 10 in the radial direction. This configuration prevents flexural load from being applied to the shafts located on the axis Ar of the transmission device 10 from such belts or the like, which makes it possible to reduce vibrations.

According to the present embodiment, the constant-speed rotor 52 of the electrically powered device 50 and the constant-speed input shaft Ac of the transmission device 10 are connected via the constant-speed flexible coupling 97, which permits eccentricity/deviation/wobble between the constant-speed rotor 52 and the constant-speed input shaft Ac. Furthermore, according to the present embodiment, the variable-speed rotor 72 of the electrically powered device 50 and the variable-speed input shaft Av of the transmission device 10 are connected via the variable-speed flexible coupling 95, which permits eccentricity/deviation/wobble between the variable-speed rotor 72 and the variable-speed input shaft Av. As such, according to the present embodiment, the burden of operations for centering the transmission device 10 relative to the electrically powered device 50 can be kept to a minimum, and the transmission of shaft wobble from the electrically powered device 50 to the transmission device 10 and the transmission of shaft wobble from the transmission device 10 to the electrically powered device 50 can be suppressed.

Additionally, according to the present embodiment, the constant-speed flexible coupling (second flexible coupling) 97 is disposed on an inner peripheral side of the variable-speed flexible coupling (first flexible coupling) 95, but because the length dimension of the constant-speed flexible coupling (second flexible coupling) 97 in the axial direction is less than or equal to the length dimension of the variable-speed flexible coupling (first flexible coupling) 95 in the axial direction, operations for attaching the flexible couplings 97 and 95 can be carried out with ease.

According to the present embodiment, the variable-speed electric motor casing 81 is fixed to the constant-speed electric motor casing 61. As such, according to the present embodiment, the variable-speed rotor 72 can be positioned (centered) accurately relative to the constant-speed rotor 52 before the variable electric motor system is shipped from the factory. Thus according to the present embodiment, operations for positioning the variable-speed rotor 72 relative to the constant-speed rotor 52 need not be carried out at the site where the system is installed.

According to the present embodiment, as the constant-speed rotor 52 rotates, the cooling fan 91 provided at the end of the constant-speed rotor 52 also rotates. The rotation of the cooling fan 91 causes air to flow into the constant-speed electric motor casing 61 from the outside and cools the constant-speed rotor 52, the constant-speed stator 66, and the like. Furthermore, according to the present embodiment, the constant-speed electric motor casing 61 and the variable-speed electric motor casing 81 communicate with each other, and thus the air flowing into the constant-speed electric motor casing 61 also flows into the variable-speed electric motor casing 81 and cools the variable-speed rotor 72, the variable-speed stator 86, and the like. Thus according to the present embodiment, the two electric motors can be cooled by the single cooling fan 91. This configuration allows for a reduction in size of the device and allows for a reduction in manufacturing cost.

Additionally, according to the present embodiment, the constant-speed rotor 52, the variable-speed rotor 72, and the sun gear shaft 12 are disposed on the same axis, which makes it possible to reduce the amount of space required to install the variable electric motor system (installation space). Components for transmitting rotation (bevel gears and the like) are also unnecessary, which makes it possible to suppress an increase in the number of components and reduce manufacturing costs.

Additionally, according to the present embodiment, the constant-speed rotor shaft 53 (constant-speed rotor extension shaft 55), which is a rod-shaped shaft, is inserted through the variable-speed rotor shaft 73, which is a cylindrical shaft through which the shaft insertion hole 74 is formed. In other words, the constant-speed rotor shaft 53 of the constant-speed electric motor 51, which has a high output, is inserted through the variable-speed rotor shaft 73 of the variable-speed electric motor 71, which has a lower output than the constant-speed electric motor 51. As a result, a higher-output (horsepower) motor can be employed as the constant-speed electric motor 51.

Additionally, according to the present embodiment, the constant-speed electric motor 51, the variable-speed electric motor 71, the transmission device, and the compressor C are arranged linearly in that order, and thus the overall device can be made more compact.

Second Embodiment

A second embodiment of the variable electric motor system according to the present invention will be described with reference to FIGS. 6 and 7.

Figure 6:
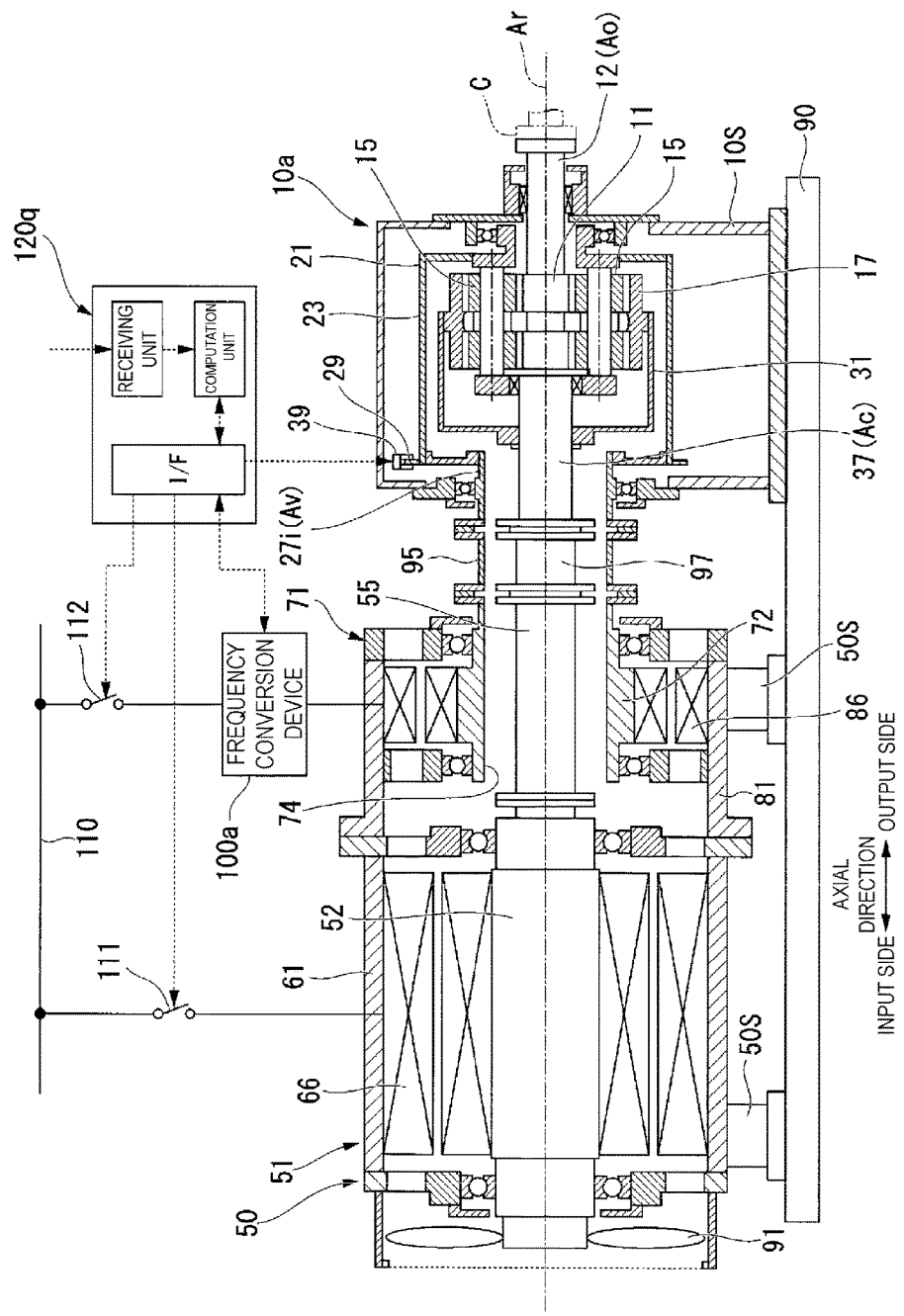
FIG. 6 is a cross-sectional view of a variable electric motor system according to a second embodiment of the present invention.
Figure 7:
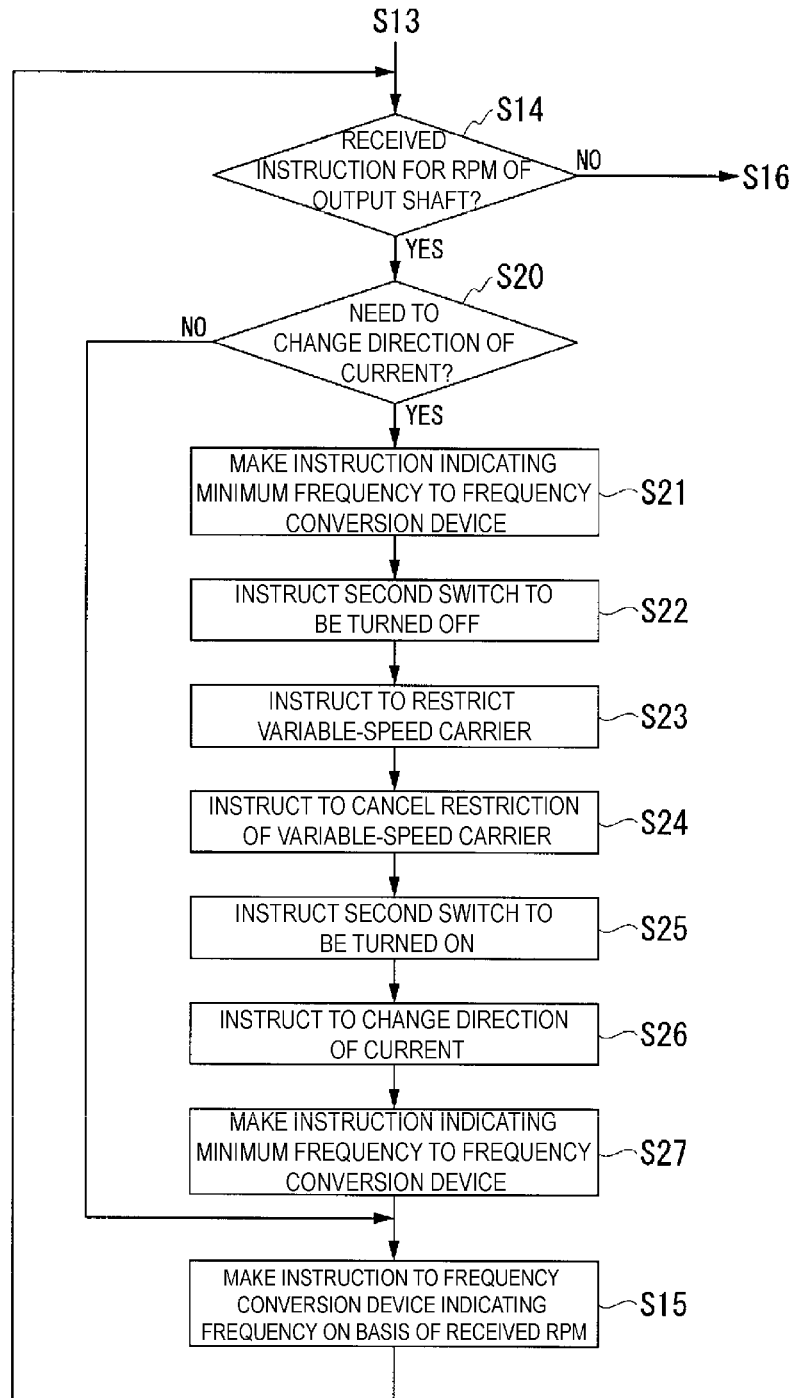
FIG. 7 is a flowchart illustrating operations of a controller according to the second embodiment of the present invention.

As illustrated in FIG. 6, the variable electric motor system according to the present embodiment includes the electrically powered device 50, a transmission device 10a, a frequency conversion device 100a, the first switch 111, the second switch 112, and a controller 120a, like the driving force applying device according to the first embodiment. Of these, the electrically powered device 50, the first switch 111, and the second switch 112 are the same as those in the first embodiment.

The transmission device 10a according to the present embodiment includes a brake 39 that restricts the rotation of the planet gear carrier 21 about the axis Ar. The planet gear carrier 21 includes a brake disc 29 having an annular shape that extends outward from the carrier main body 23. The brake 39 attached to the transmission casing 41 presses the brake disc 29 of the planet gear carrier 21 from both sides to restrict the rotation of the planet gear carrier 21.

The frequency conversion device 100a according to the present embodiment can change the frequency of power to be supplied to the variable-speed electric motor 71 and can change the direction of current to be supplied to the variable-speed electric motor 71. In other words, the variable-speed electric motor 71 can be used to generate power. Accordingly, the frequency conversion device 100a according to the present embodiment, which is a reversible frequency conversion device, can change the rotation direction of the variable-speed rotor 72 of the variable-speed electric motor 71.

Like the controller 120 according to the first embodiment, the controller 120a according to the present embodiment controls the operations of the frequency conversion device 100a, the first switch 111, and the second switch 112. Furthermore, the controller 120a according to the present embodiment instructs the frequency conversion device 100a to change the direction of the current to be supplied to the variable-speed electric motor 71. Additionally, the controller 120a according to the present embodiment instructs the brake 39 of the transmission device 10a to restrict the rotation of the planet gear carrier 21, and instructs the brake 39 to cancel the restriction.

In the first embodiment, in the case where the RPM of the constant-speed rotor 52 is +1,500 rpm, the RPM of the variable-speed rotor 72 is controlled in a range of −50 to −500 rpm through the frequency control carried out by the frequency conversion device 100 so that the RPM of the output shaft Ao is controlled in a range of −12,450 to −16,500 rpm. Assuming the direction of the current to be supplied to the variable-speed electric motor 71 can be changed, the RPM of the variable-speed rotor 72 can be set in a range of +50 to +500 rpm, and the RPM of the output shaft Ao can be set in a range of −11,550 to −7,500, as described above.

As such, according to the present embodiment, a reversible frequency conversion device capable of changing the direction of the current to be supplied to the variable-speed electric motor 71 is employed as the frequency conversion device 100a, which broadens the range across which the RPM of the output shaft Ao can be varied.

Operations for starting up and stopping the variable electric motor system according to the present embodiment are the same as the operations of the variable electric motor system according to the first embodiment. The variable electric motor system according to the present embodiment differs from the variable electric motor system according to the first embodiment in terms of operations carried out when changing the RPM of the output shaft Ao of the transmission device 10a to desired RPM after the output shaft Ao has started to rotate.

Accordingly, operations of the variable electric motor system carried out when changing the RPM of the output shaft Ao to desired RPM will be described below according to the flowchart in FIG. 7.

As in the first embodiment, the controller 120a outputs the on instruction to the first switch 111 (S13). Then, upon receiving an instruction indicating the target RPM of the output shaft Ao after the constant-speed electric motor 51 has started to rotate at, for example, 1,500 rpm (S14), the controller 120a determines if it is necessary to change the direction of the current to be supplied to the variable-speed electric motor 71 in order to achieve the target RPM (S20: a determination step).

Upon determining that it is necessary to change the direction of the current to be supplied to the variable-speed electric motor 71, the controller 120a makes an instruction indicating the minimum frequency to the frequency conversion device 100a (S21: a first minimum frequency instruction step).

Upon receiving the minimum frequency as the instructed frequency value from the controller 120a, the frequency conversion device 100a converts the frequency of the power from the power source line 110 to the minimum frequency and supplies that power to the variable-speed electric motor 71. As a result, the variable-speed electric motor 71 enters the power-supplied state in which power is being supplied at the minimum frequency. Accordingly, in the case where the variable-speed electric motor 71 is rotating in a direction opposite to the rotation direction of the constant-speed electric motor 51, the variable-speed electric motor 71 will rotate at minimum RPM of −50 rpm, whereas in the case where the variable-speed electric motor 71 is rotating in a direction the same as the rotation direction of the constant-speed electric motor 51, the variable-speed electric motor 71 will rotate at minimum RPM of +50 rpm. As a result, the RPM of the output shaft Ao of the transmission device 10a will be −12,450 rpm in the case where the variable-speed electric motor 71 is rotating in a direction opposite to the rotation direction of the constant-speed electric motor 51, and will be −11,550 rpm in the case where the variable-speed electric motor 71 is rotating in a direction the same as the rotation direction of the constant-speed electric motor 51.

Upon the RPM of the variable-speed electric motor 71 reaching the minimum RPM (−50 rpm or +50 rpm), the controller 120a outputs the off instruction to the second switch 112 (S22: a switch off instruction step), and instructs the brake 39 to restrict the rotation of the planet gear carrier 21 (or the variable-speed input shaft Av) (S23). This causes the variable-speed electric motor 71 to enter the power-cutoff state, and stops the rotation, about the axis Ar, of the planet gear carrier 21 (or the variable-speed input shaft Av) connected to the variable-speed electric motor 71.

Upon the rotation of the planet gear carrier 21 (or the variable-speed input shaft Av) stopping, the controller 120a instructs the brake 39 to cancel the restriction on the rotation of the planet gear carrier 21 (or the variable-speed input shaft Av) (S24), and outputs the on instruction to the second switch 112 (S25). Furthermore, the controller 120a instructs the frequency conversion device 100a to change the direction of the current to be supplied to the variable-speed electric motor 71 (S26), and makes an instruction indicating the minimum frequency (S27: a second minimum frequency instruction step). As a result, the variable-speed electric motor 71 enters the power-supplied state in which the direction of the supplied current is reversed, the RPM of the variable-speed electric motor 71 becomes the minimum RPM, and the rotation direction thereof is reversed. Thus, in the case where the variable-speed electric motor 71 is first rotating in the direction opposite to the rotation direction of the constant-speed electric motor 51, the rotation direction of the variable-speed electric motor 71 will become the same as the rotation direction of the constant-speed electric motor 51, and the RPM thereof will be the minimum RPM of +50 rpm. As a result, the RPM of the output shaft Ao of the transmission device 10a will be −11,550 rpm. In the case where the variable-speed electric motor 71 is first rotating in the direction the same as the rotation direction of the constant-speed electric motor 51, the rotation direction of the variable-speed electric motor 71 will become opposite to the rotation direction of the constant-speed electric motor 51, and the RPM thereof will be the minimum RPM of −50 rpm. As a result, the RPM of the output shaft Ao of the transmission device 10a will be −12,450 rpm. Note that in the present embodiment, the above-described processing steps of S25 and S26 constitute a switch on/current direction change instruction step. Additionally, in the present embodiment, the above-described processing steps of S23 and S24 constitute a brake operation instruction step.

Upon the RPM of the variable-speed electric motor 71 reaching the minimum RPM, the controller 120a makes an instruction to the frequency conversion device 100a indicating a frequency corresponding to the target RPM of the output shaft Ao received in step 14 (S14), in the same manner as in the first embodiment (S15: a target frequency instruction step).

Even in the case where the controller 120a has determined in step 20 (S20) that the direction of the current need not be changed, the controller 120a makes an instruction to the frequency conversion device 100a indicating a frequency corresponding to the target RPM of the output shaft Ao received in step 14 (S14) (S15: the target frequency instruction step).

Upon receiving this instruction, the frequency conversion device 100a supplies power to the variable-speed electric motor 71 at the frequency corresponding to the received target RPM. The RPM of the variable-speed electric motor 71 and the RPM of the variable-speed input shaft Av connected thereto becomes RPM corresponding to the target RPM of the output shaft Ao (+50 to +500 rpm or −50 to −500 rpm), and as a result, the RPM of the output shaft Ao becomes the target RPM (−7,500 to −11,550 rpm or −12,450 to −16,500 rpm).

As described thus far, according to the present embodiment, a reversible frequency conversion device capable of changing the direction of the current to be supplied to the variable-speed electric motor 71 is employed as the frequency conversion device 100a, which makes it possible to broaden the range across which the RPM of the output shaft Ao can be varied.

Additionally, according to the present embodiment, in the case where the direction of the current to be supplied to the variable-speed electric motor 71 is changed and the rotation direction of the variable-speed electric motor 71 is changed, the RPM is brought to the minimum RPM in the current rotation direction, before the rotation of the variable-speed electric motor 71 and the rotation of the variable-speed input shaft Av are restricted. According to the present embodiment, after the restriction on the rotation of the variable-speed input shaft Av is canceled, the rotation direction of the variable-speed electric motor 71 is set to a direction opposite to the previous rotation, and the RPM thereof is set to the minimum RPM. The RPM is then set to RPM corresponding to the target RPM of the output shaft Ao. As such, according to the present embodiment, in the case where the direction of the current to be supplied to the variable-speed electric motor 71 is changed, sudden changes in the RPM of the output shaft Ao and the RPM of the variable-speed electric motor 71 can be suppressed, which makes it possible to reduce the load on the variable-speed electric motor 71 in this case.

In the embodiment described above, the transmission device 10a is provided with the brake 39, and the rotation of the variable-speed input shaft Av connected to the variable-speed electric motor 71 is temporarily restricted by this brake 39 when the direction of the current to be supplied to the variable-speed electric motor 71 is to be changed. However, the transmission device 10a need not be provided with the brake 39 and need not restrict the rotation of the variable-speed input shaft Av connected to the variable-speed electric motor 71 when the direction of the current to be supplied to the variable-speed electric motor 71 is to be changed. Note that this configuration will apply a load greater than in the present embodiment to the variable-speed electric motor 71 when the direction of the current to be supplied to the variable-speed electric motor 71 is changed.

Third Embodiment

A third embodiment of the variable electric motor system according to the present invention will be described with reference to FIGS. 8 and 9.

Figure 8:
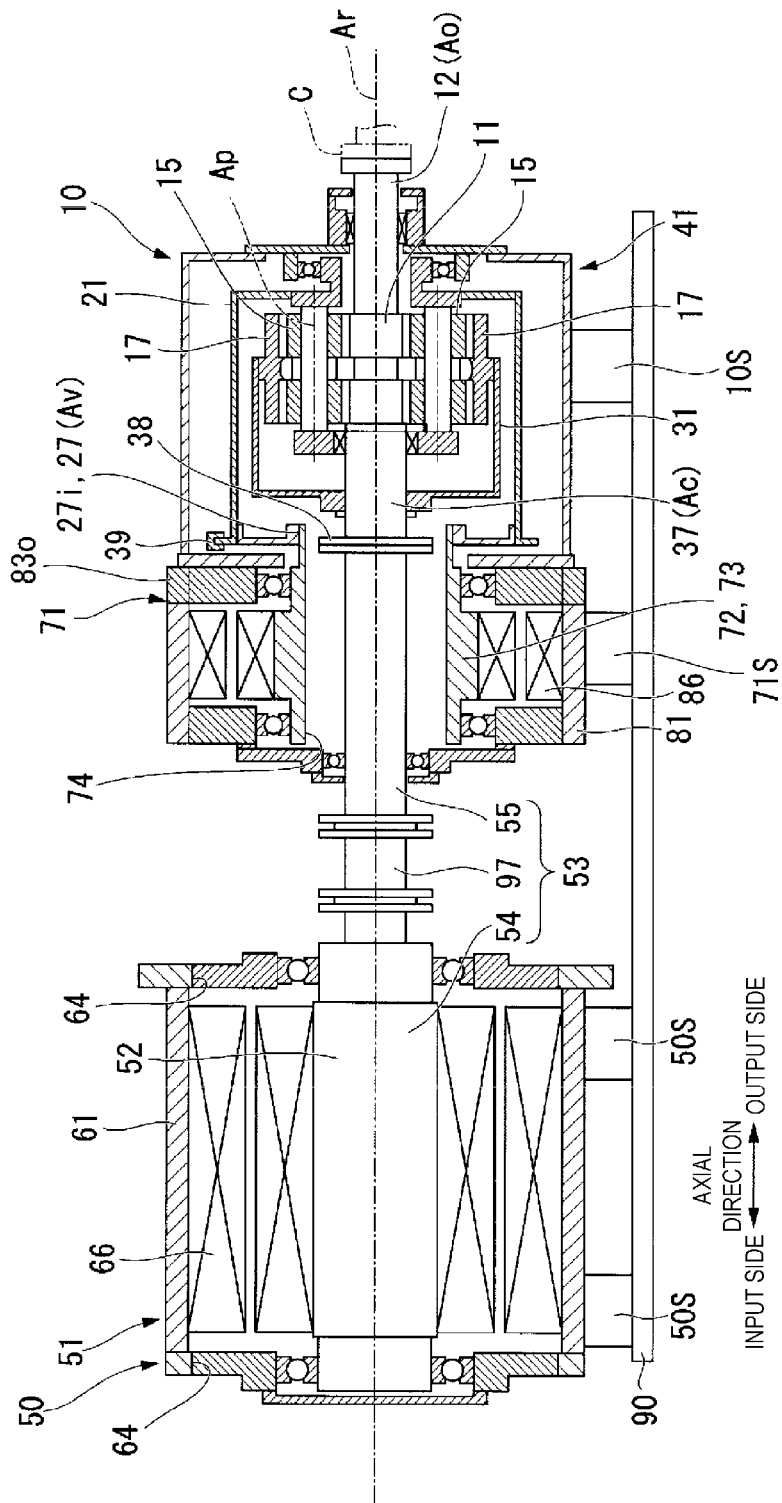
FIG. 8 is a cross-sectional view of a variable electric motor system according to a third embodiment of the present invention.
Figure 9:
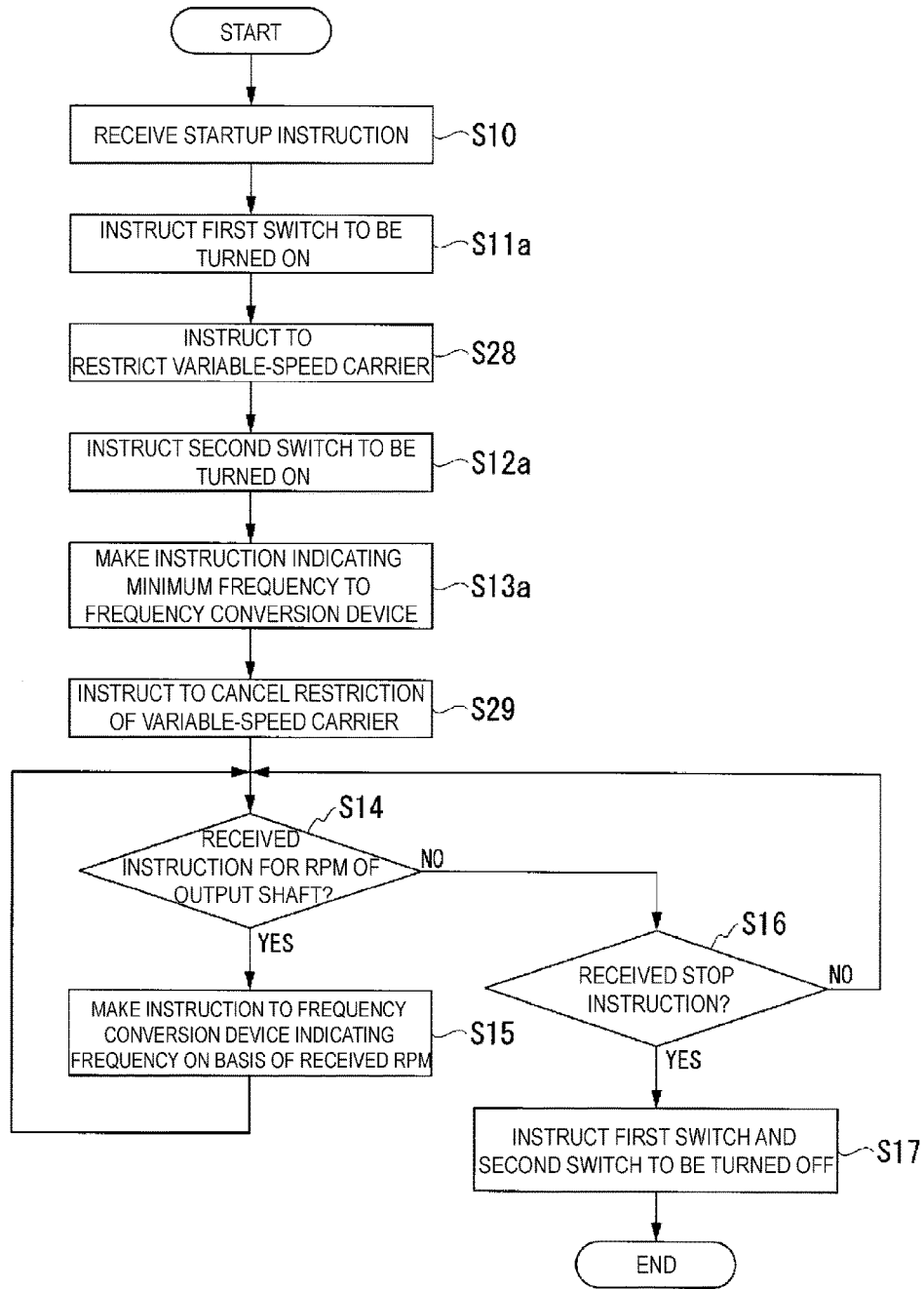
FIG. 9 is a flowchart illustrating operations of a controller according to the third embodiment of the present invention.

As illustrated in FIG. 8, in the variable electric motor system according to the present embodiment, the constant-speed electric motor casing 61 of the constant-speed electric motor 51 and the variable-speed electric motor casing 81 of the variable-speed electric motor 71, which constitute the electrically powered device 50, are separated. The variable-speed electric motor casing 81 and the transmission casing 41 of the transmission device 10 are integrated.

The electrically powered device 50 is fixed to the frame 90 by the electrically powered device support portion 50S. The variable-speed electric motor 71 is fixed to the frame 90 by a variable-speed electric motor support portion 71S. The transmission device 10 is fixed to the frame 90 by the transmission device support portion 10S. Additionally, the compressor C serving as the driving target is also fixed to the frame 90 by a support portion (not illustrated). Because the variable-speed electric motor casing 81 and the transmission casing 41 according to the present embodiment are integrated, it is only required that at least one of the variable-speed electric motor support portion 71S and the transmission device support portion 10S to be provided as a support portion.

Note that the frame 90 may be divided for the electrically powered device 50, the variable-speed electric motor 71 and transmission device 10, and the compressor C, or may be integrated as any combination thereof.

The variable-speed electric motor casing 81 and the transmission casing 41 are strongly connected. That is, the output-side cap 83o of the variable-speed electric motor casing 81 and the transmission casing 41 are strongly joined to each other by using bolts or by welding, for example.

The constant-speed rotor main body shaft 54 that constitutes the constant-speed rotor shaft 53 and the constant-speed rotor extension shaft 55 that is inserted through the shaft insertion hole 74 of the variable-speed rotor shaft 73 are connected via the constant-speed flexible coupling 97. In other words, the constant-speed rotor shaft 53 according to the present embodiment includes the constant-speed rotor main body shaft 54, the constant-speed rotor extension shaft 55, and the constant-speed flexible coupling 97.

The constant-speed rotor extension shaft 55 and the internal gear carrier shaft 37 are fixed via the flange 55o of the constant-speed rotor extension shaft 55 and the flange 38 of the internal gear carrier shaft 37. Alternatively, the constant-speed rotor extension shaft 55 and the internal gear carrier shaft 37 may be integrated without the flange 38.

In other words, according to the present embodiment, the constant-speed rotor extension shaft 55 and the internal gear carrier shaft 37 are not connected via a flexible coupling. Additionally, the variable-speed rotor shaft 73 of the variable-speed rotor 72 and the input-side planet gear carrier shaft 27i of the planet gear carrier shaft 27 are not connected via a flexible coupling, and are connected directly by using bolts or the like or are connected via a gear coupling or the like. Note that the constant-speed rotor extension shaft 55 and the internal gear carrier shaft 37 may be integrated without the flange 55o and the flange 38.

Next, operations of the variable electric motor system according to the present embodiment, from when the system is started to when the system is stopped, will be described according to the flowchart illustrated in FIG. 9.

Upon receiving an instruction from the outside to start the variable electric motor system (S10), the controller 120 outputs the on instruction to the first switch 111 (S11a).

Here, the controller 120 instructs the brake 39 to restrict the rotation of the planet gear carrier 21 (or the variable-speed input shaft Av) (S28).

Upon the RPM of the constant-speed electric motor 51 reaching predetermined RPM (1,500 rpm, for example), the controller 120 outputs the on instruction to the second switch 112 (S12a), and makes an instruction indicating the minimum frequency to the frequency conversion device 100 (S13a). Next, the controller 120 outputs an instruction for canceling the restriction on the rotation of the planet gear carrier 21 (or the variable-speed input shaft Av) by the brake 39 (S29).

According to the present embodiment, the constant-speed electric motor 51 and the variable-speed electric motor 71 are separated, and thus a standard (commercial) constant-speed electric motor can be used. This makes it possible to further reduce manufacturing costs.

Furthermore, the variable-speed flexible coupling 95 can be omitted. This makes it possible to further reduce manufacturing costs.

Additionally, according to the present embodiment, the constant-speed electric motor 51, which has a higher output, is started before the variable-speed electric motor 71, which makes it possible to reduce the load applied to the variable-speed electric motor 71 as compared to a case where the variable-speed electric motor 71 is started first. In other words, this makes it possible to avoid a phenomenon where, in the case where the variable-speed electric motor 71 is started first, the variable-speed electric motor 71 is unable to handle sudden fluctuations in torque arising when the constant-speed electric motor 51 is started and the RPM is greater or less than the assumed RPM as a result.

Note that the method for starting the constant-speed electric motor 51 before the variable-speed electric motor 71 can also be applied to the variable electric motor system according to the first embodiment and to the variable electric motor system according to the second embodiment.

Fourth Embodiment

A fourth embodiment of the variable electric motor system according to the present invention will be described with reference to FIG. 10.

Figure 10:
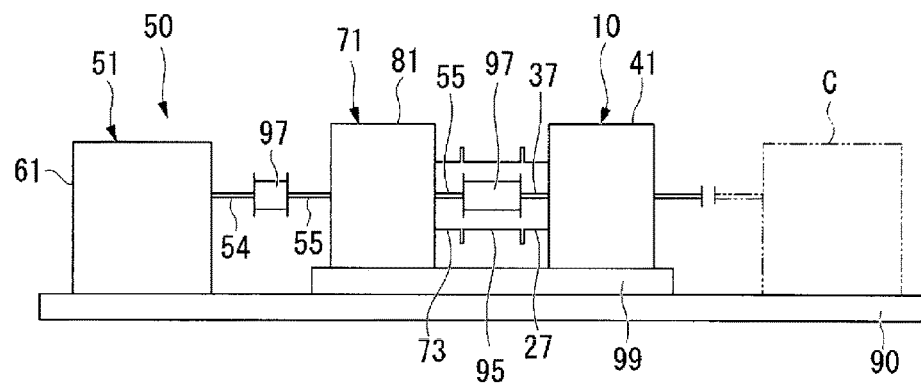
FIG. 10 is a schematic configuration diagram of a variable electric motor system according to a fourth embodiment of the present invention.

As illustrated in FIG. 10, in the variable electric motor system according to the present embodiment, the constant-speed electric motor casing 61 of the constant-speed electric motor 51 and the variable-speed electric motor casing 81 of the variable-speed electric motor 71, which constitute the electrically powered device 50, are separated. The variable-speed electric motor casing 81 and the transmission casing 41 of the transmission device 10 are separated.

The variable-speed electric motor 71 and the transmission device 10 are disposed on a shared second frame 99. To rephrase, the variable-speed electric motor 71 and the transmission device 10 are integrated via the second frame 99. The second frame 99 is supported by the frame 90. Like the variable electric motor system according to the third embodiment, the constant-speed rotor main body shaft 54 and the constant-speed rotor extension shaft 55 are connected via the constant-speed flexible coupling 97.

Like the variable electric motor system according to the first embodiment, the variable-speed rotor shaft 73 and the planet gear carrier shaft 27 are connected via the variable-speed flexible coupling 95. Additionally, like the first and second embodiments, the constant-speed rotor extension shaft 55 and the internal gear carrier shaft 37 are connected via the constant-speed flexible coupling 97.

According to the above-described embodiment, integrating the variable-speed electric motor 71 and the transmission device 10 by using the second frame 99 makes it possible to transport the variable-speed electric motor 71 and the transmission device 10 as a single unit without being separated when the variable electric motor system is to be installed, for example. Accordingly, the task of aligning the output shaft of the variable-speed electric motor 71 with the input shaft of the transmission device 10 at the site where the variable electric motor system is installed can be eliminated.

Fifth Embodiment

Figure 11:
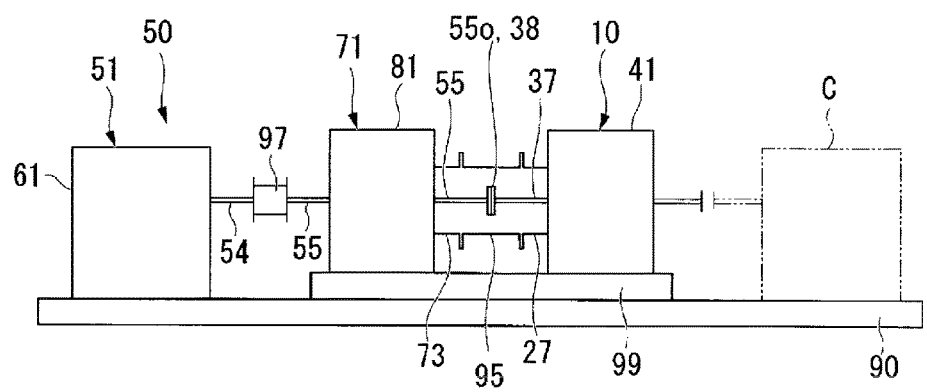
FIG. 11 is a schematic configuration diagram of a variable electric motor system according to a fifth embodiment of the present invention.

A fifth embodiment of the variable electric motor system according to the present invention will be described with reference to FIG. 11. The present embodiment will focus on differences from the above-described fourth embodiment and will omit descriptions of identical parts.

The variable electric motor system according to the present embodiment differs from the variable electric motor system according to the fourth embodiment in terms of how the constant-speed rotor extension shaft 55 and the internal gear carrier shaft 37 are connected.

Like the variable electric motor system according to the third embodiment, in the variable electric motor system according to the present embodiment, the constant-speed rotor extension shaft 55 and the internal gear carrier shaft 37 are fixed via the flange 55o of the constant-speed rotor extension shaft 55 and the flange 38 of the internal gear carrier shaft 37. Alternatively, the constant-speed rotor extension shaft 55 and the internal gear carrier shaft 37 may be integrated without the flange 38.

Sixth Embodiment

A sixth embodiment of the variable electric motor system according to the present invention will be described with reference to FIG. 12. The present embodiment will focus on differences from the above-described fourth and fifth embodiments and will omit descriptions of identical parts.

Figure 12:
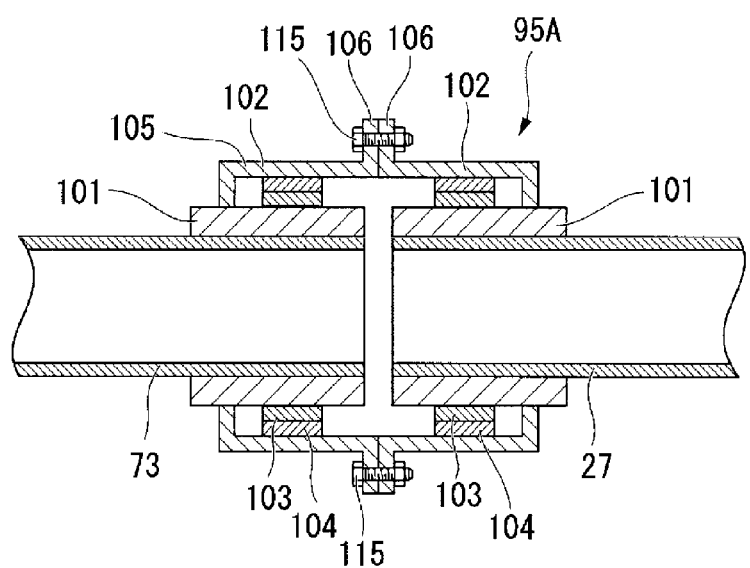
FIG. 12 is a cross-sectional view of a gear coupling according to a sixth embodiment of the present invention.

The variable electric motor system according to the present embodiment uses a gear coupling 95A, such as that illustrated in FIG. 12, to connect the variable-speed rotor shaft 73 and the planet gear carrier shaft 27, instead of the variable-speed flexible coupling 95 used in the fourth and fifth embodiments.

As illustrated in FIG. 12, the gear coupling 95A includes a pair of cylindrical coupling main bodies 101 and a pair of coupling cases 102. An outer gear 103 is formed on an outer peripheral surface of each coupling main body 101. The outer gear 103 extends in the circumferential direction on the outer peripheral surface of the coupling main body 101.

Note that the coupling main bodies 101 may be omitted and the outer gears 103 may be provided directly on the outer peripheral surfaces of the variable-speed rotor shaft 73 and the planet gear carrier shaft 27.

A coupling case 102 includes a cylindrical coupling case main body 105 and a flange portion 106 projecting in the radial direction from an end of the coupling case main body 105 in the axial direction. An inner gear 104 that meshes with the outer gear 103 of the coupling main body 101 is formed on an inner peripheral surface of the coupling case main body 105.

The gear coupling 95A connects the coupling main body 101 and coupling case 102 attached to one of the shafts (the variable-speed rotor shaft 73 here) to the coupling main body 101 and coupling case 102 attached to the other of the shafts (the planet gear carrier shaft 27 here) via the pair of flange portions 106. The pair of flange portions 106 are tightened by tightening members such as bolts 115. The shafts and the coupling main bodies 101 of the gear coupling 95A are fixed via keys (not illustrated). Alternatively, the shafts and the coupling main bodies 101 of the gear coupling 95A may be fixed through interference fitting or the like.

Note that the coupling main bodies 101 may be omitted and the outer gears 103 may be provided directly on the outer peripheral surfaces of the variable-speed rotor shaft 73 and the planet gear carrier shaft 27.

According to the embodiment described above, torque is transmitted by the gear structure, and thus a large amount of torque can be transmitted. Additionally, dimensions in the axial direction of the connecting portion between the one shaft and the other shaft can be reduced. Furthermore, the one shaft can be connected to the other shaft with ease.

A variation on the sixth embodiment will be described below.

Figure 13:
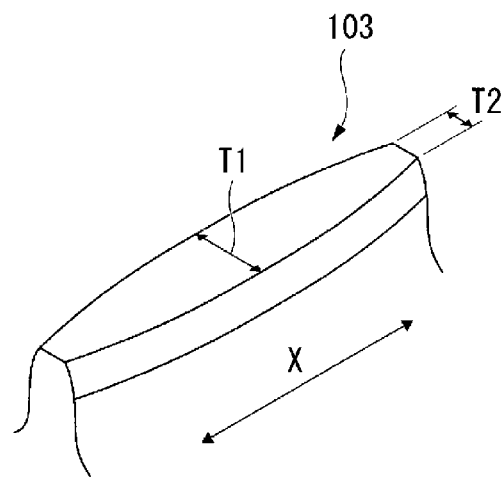
FIG. 13 is a perspective view of an outer gear of a gear coupling according to a variation on the sixth embodiment of the present invention.

As illustrated in FIG. 13, the outer gears 103 of the gear coupling according to the variation on the sixth embodiment have been subjected to a tooth trace correction. Specifically, crowning has been carried out on the outer gears 103. In other words, each outer gear 103 is formed so that a thickness T1 of a central portion of a tooth width direction X (an axial direction of the gear coupling main body 101) is greater than a thickness T2 of both ends in the tooth width direction. To rephrase, the outer gear 103 is thicker in the central portion in the tooth width direction X than at both the ends.

According to this variation, tooth contact concentrates at the central portion in the tooth width direction X, which makes it possible to increase the amount of shaft angle error that is permitted. Accordingly, shaft angle error resulting from alignment error occurring when the variable electric motor system is assembled, thermal expansion of the shaft during operation, and the like can be permitted.

Although crowning is used as the tooth trace correction in this variation, the correction is not limited thereto as long as shaft angle error between shafts can be permitted. For example, an end relief technique with which only both ends in the tooth width direction are machined can also be employed.

Seventh Embodiment

A seventh embodiment of the variable electric motor system according to the present invention will be described with reference to FIG. 14.

Figure 14:
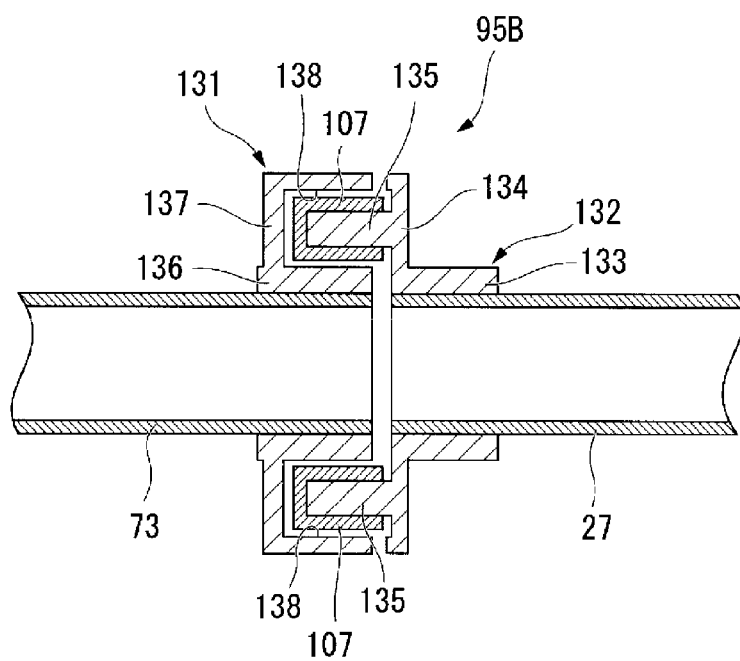
FIG. 14 is a cross-sectional view of a damper coupling according to a seventh embodiment of the present invention.

The variable electric motor system according to the present embodiment uses a damper coupling 95B, such as that illustrated in FIG. 14, to connect the variable-speed rotor shaft 73 and the planet gear carrier shaft 27, instead of the variable-speed flexible coupling 95 used in the fourth and fifth embodiments.

As illustrated in FIG. 14, the damper coupling 95B includes a damper coupling first portion 131 attached to the variable-speed rotor shaft 73, a damper coupling second portion 132 attached to the planet gear carrier shaft 27, and a plurality of damper rubbers 107 interposed between the damper coupling first portion 131 and the damper coupling second portion 132.

The damper coupling second portion 132 includes a second cylindrical portion 133 having a cylindrical shape, a disk-shaped second projecting portion 134 that projects outward in a radial direction from an outer peripheral surface of the second cylindrical portion 133, and a plurality of claw portions 135 that project from one surface of the second projecting portion 134. A plurality of the claw portions 135 each having a circular column shape are provided with spaces therebetween in the circumferential direction.

The damper coupling first portion 131 includes a first cylindrical portion 136 having a cylindrical shape and a first projecting portion 137 that projects outward in the radial direction from an outer peripheral surface of the first cylindrical portion 136. A plurality of claw housing holes 138 are formed in the first projecting portion 137.

The damper rubbers 107 are buffer members that are formed of rubber and have bottomed cylindrical shapes. The damper rubbers 107 are attached to the claw portions 135 of the damper coupling second portion 132. The damper rubbers 107 are attached so as to cover outer peripheral surfaces and leading end surfaces of the claw portions 135.

The claw housing holes 138 have shapes into which the claw portions 135 to which the damper rubbers 107 are attached can fit. In other words, the damper rubbers 107 are each interposed between corresponding claw portion 135 and claw housing hole 138.

Although this embodiment is configured such that the claw portions 135 are formed in the damper coupling second portion 132 and the claw housing holes 138 are formed in the damper coupling first portion 131, the configuration is not limited thereto. For example, the claw portions 135 may be formed in the damper coupling first portion 131 and the claw housing holes 138 may be formed in the damper coupling second portion 132. Alternatively, the configuration may be such that the claw portions 135 and the claw housing holes 138 are provided in both the damper coupling first portion 131 and the damper coupling second portion 132.

Additionally, like the fifth embodiment, the constant-speed rotor extension shaft 55 and the internal gear carrier shaft 37 may be fixed via the flange 55o of the constant-speed rotor extension shaft 55 and the flange 38 of the internal gear carrier shaft 37. Alternatively, the constant-speed rotor extension shaft 55 and the internal gear carrier shaft 37 may be integrated without the flange 38.

According to this embodiment, even if the torque of the variable-speed electric motor fluctuates momentarily, fluctuations in the torque can be accommodated by the damper rubbers. This makes it possible to reduce loads applied to the internal components of the variable-speed electric motor and the transmission device, the coupling, and the like. Misalignment arising when connecting the shafts to each other, alignment error caused by thermal deformation, and the like can be accommodated as well.

Eighth Embodiment

Figure 15:
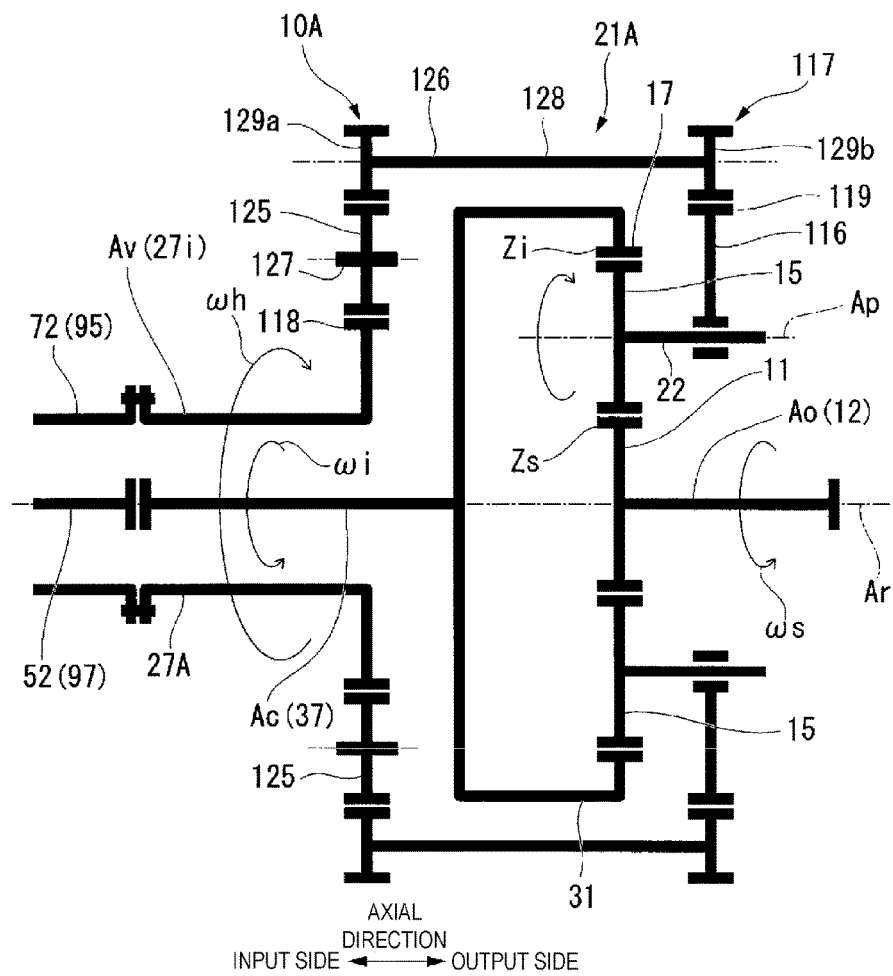
FIG. 15 is a schematic view illustrating the configuration of a transmission device according to an eighth embodiment of the present invention.

An eighth embodiment of the variable electric motor system according to the present invention will be described with reference to FIG. 15.

A transmission device 10A of the variable electric motor system according to the present embodiment differs in terms of the structure of the planet gear carrier. As illustrated in FIG. 15, a planet gear carrier 21A according to the present embodiment includes a planet gear carrier shaft 27A, a planet gear shaft 22 provided for each of the plurality of planet gears 15, a carrier main body 116 that fixes the relative positions of the plurality of planet gear carrier shafts 22, and a transmission portion 117 that transmits rotation of the planet gear carrier shaft 27A to the carrier main body 116.

In other words, in the planet gear carrier 21A according to the present embodiment, the planet gear carrier shaft 27A and the carrier main body 116 are not integrated.

A carrier shaft gear 118 is formed on an outer peripheral surface of the planet gear carrier shaft 27A according to the present embodiment. Additionally, a carrier main body gear 119 is formed on an outer peripheral surface of the carrier main body 116 according to the present embodiment.

The transmission portion 117 includes the carrier shaft gear 118 formed on the outer peripheral surface of the planet gear carrier shaft 27A, the carrier main body gear 119 formed on the outer peripheral surface of the carrier main body 116, a pair of idle gears 125 that rotate by meshing with the carrier shaft gear 118, and a pair of transmission shaft gears 126 that extend in the axial direction and mesh with the idle gears 125 and the carrier main body gear 119.

The idle gears 125 are gears capable of rotating about an idle gear shaft 127 that extends in a horizontal direction, and are disposed so as to mesh with the carrier shaft gear 118. The idle gears 125 according to the present embodiment are disposed on the left and right of the carrier shaft gear 118 in the horizontal direction.

The transmission shaft gears 126 are shaft-shaped gears that mesh with the idle gears 125 and the carrier main body gear 119. Each of the transmission shaft gears 126 according to the present embodiment includes a main body shaft 128, and a first transmission shaft gear 129a and a second transmission shaft gear 129b. The first transmission shaft gear 129a and the second transmission shaft gear 129b are provided on either end of the main body shaft 128 and mesh with the idle gear 125 and the carrier main body gear 119, respectively. The transmission shaft gears 126 are disposed to the left of the idle gear 125 on the left side in the horizontal direction and to the right of the idle gear 125 on the right side in the horizontal direction.

According to this embodiment, the components constituting the planet gear carrier are smaller, and thus the transmission device 10A can be assembled with ease.

Additionally, the planet gears 15 and the like that constitute the transmission device 10A are more visible than the planet gear carrier 21 according to the first embodiment to the seventh embodiment, and thus maintenance can be carried out with ease.

Variation

A variation on the embodiments of the variable electric motor system described above will be described below.

All of the variable electric motor systems according to the above-described embodiments take the compressor C as the driving target and drive the compressor C at high RPM of 7,500 rpm or greater. To drive the driving target at high RPM in this manner, the variable electric motor systems according to the above-described embodiments cause the transmission devices 10 and 10a to increase the RPM of the constant-speed electric motor 51. Accordingly, the transmission devices 10 and 10a take the sun gear shaft 12 as the output shaft Ao, the internal gear carrier shaft 37 as the constant-speed input shaft Ac, and the input-side planet gear carrier shaft 27i as the variable-speed input shaft Av.

However, the transmission device in the rotational driving force transmission device according to the present invention may be a device for reducing the RPM of the constant-speed electric motor 51. In this case, the sun gear shaft 12 may be taken as the constant-speed input shaft Ac, the planet gear carrier shaft 27 may be taken as the variable-speed input shaft Av, and the internal gear carrier shaft 37 may be taken as the output shaft Ao. Alternatively, for example, the sun gear shaft 12 may be taken as the output shaft Ao in the same manner as in the above-described embodiments, while the internal gear carrier shaft 37 may be taken as the variable-speed input shaft Av and the planet gear carrier shaft 27 may be taken as the constant-speed input shaft Ac. As described above, whether one of the sun gear shaft 12, the planet gear carrier shaft 27, and the internal gear carrier shaft 37 is taken as the output shaft Ao, another shaft is taken as the constant-speed input shaft Ac, and the other shaft is taken as the variable-speed input shaft Av can be determined as appropriate on the basis of whether or not the output is to be increased relative to the input, a variation range in which the output is to be increased or decreased, and the like.

Even in the case where one of the sun gear shaft 12, the planet gear carrier shaft 27, and the internal gear carrier shaft 37 is taken as the output shaft Ao, another shaft is taken as the constant-speed input shaft Ac, and the other shaft is taken as the variable-speed input shaft Av, arranging the constant-speed rotor 52 connected to the constant-speed input shaft Ac and the variable-speed rotor 72 connected to the variable-speed input shaft Av on the same axis makes it possible to reduce the size of the device and to reduce manufacturing costs, as in the above-described embodiments.

The above embodiments describe examples in which a four-pole induction motor is used as the constant-speed electric motor 51 in order to suitably drive the compressor C at high RPM, and a 12-pole induction motor is used as the variable-speed electric motor 71 in order to suitably change the RPM of the compressor C within a set range. However, in the case where it is not necessary to drive the driving target at high RPM, other types of electric motors may be used as the constant-speed electric motor 51, the variable-speed electric motor 71, and the like.

In the above-described embodiments, the variable-speed rotor 72 through which the shaft insertion hole 74 is formed constitutes the first rotor, and the constant-speed rotor 52 inserted through the shaft insertion hole 74 constitutes the second rotor. However, in the case where a shaft insertion hole is formed through the constant-speed rotor and the variable-speed rotor is inserted through that shaft insertion hole, the constant-speed rotor constitutes the first rotor and the variable-speed rotor constitutes the second rotor.

Additionally, in the above-described embodiments, the variable-speed flexible coupling 95 that connects the variable-speed rotor 72 and the variable-speed input shaft Av constitutes the first flexible coupling, and the constant-speed flexible coupling 97 that connects the constant-speed rotor 52 and the constant-speed input shaft Ac constitutes the second flexible coupling. However, in the case where the constant-speed flexible coupling is disposed on the outer peripheral side of the variable-speed flexible coupling, the constant-speed flexible coupling constitutes the first flexible coupling and the variable-speed flexible coupling constitutes the second flexible coupling.

INDUSTRIAL APPLICABILITY

According to an aspect of the present invention, the size of the device and the manufacturing costs can be reduced.

REFERENCE SIGNS LIST 10, 10a Transmission device (Planet gear transmission device)
10S Transmission device support portion
11 Sun gear
12 Sun gear shaft
15 Planet gear
17 Internal gear
21, 21A Planet gear carrier
22 Planet gear shaft
23 Carrier main body
27, 27A Planet gear carrier shaft
27i Input-side planet gear carrier shaft
28 Flange (Transmission device-side connecting portion)
29 Brake disc
31 Internal gear carrier
33 Carrier main body
37 Internal gear carrier shaft
38 Flange
39 Brake
41 Transmission casing
50 Electrically powered device
50S Electrically powered device support portion
51 Constant-speed electric motor
52 Constant-speed rotor
53 Constant-speed rotor shaft
54 Constant-speed rotor main body shaft
55 Constant-speed rotor extension shaft
56 Conductor
61 Constant-speed electric motor casing
62 Casing main body
63i, 63o Cap
64 Opening
66 Constant-speed stator
71 Variable-speed electric motor
71S Variable-speed electric motor support portion
72 Variable-speed rotor
73 Variable-speed rotor shaft
73o Flange (Rotor-side connecting portion)
74 Shaft insertion hole
76 Conductor
81 Variable-speed electric motor casing
82 Casing main body
83i, 83o Cap
84 Opening
86 Variable-speed stator
91 Cooling fan
95A Gear coupling
95B Damper coupling
99 Second frame (frame)
100, 100a Frequency conversion device
102 Coupling case
107 Damper rubber
111 First switch 112 Second switch
116 Carrier main body
117 Transmission portion
118 Carrier shaft gear
119 Carrier main body gear
120, 120a Controller
125 Idle gear
126 Transmission shaft gear
131 Damper coupling first portion
132 Damper coupling second portion
135 Claw portion
138 Claw housing hole
Ap Center line
Ar Axis
Ao Output shaft
Ac Constant-speed input shaft
Av Variable-speed input shaft

The invention claimed is:
1. A variable electric motor system comprising:
an electrically powered device that generates rotational driving force;
a transmission device that changes speed of the rotational driving force generated by the electrically powered device; and
a driving target that is driven by the rotational driving force from the electrically powered device,
the transmission device including:
a sun gear that rotates about an axis;
a sun gear shaft that is fixed to the sun gear and extends in an axial direction centered on the axis;
a planet gear that meshes with the sun gear, revolves around the axis, and rotates about its own center line;
an internal gear that has a plurality of teeth arranged in an annular shape centered on the axis, and meshes with the planet gear;
a planet gear carrier that has a planet gear carrier shaft extending in the axial direction centered on the axis, and supports the planet gear so as to allow the planet gear to revolve around the axis and to rotate about its own center line; and
an internal gear carrier that has an internal gear carrier shaft extending in the axis direction centered on the axis, and supports the internal gear so as to allow the internal gear to rotate about the axis,
one of the sun gear shaft, the planet gear carrier shaft, and the internal gear carrier shaft constituting an output shaft connected to a rotor of the driving target, one of the sun gear shaft, the planet gear carrier shaft, and the internal gear carrier shaft which is not the output shaft constituting a constant-speed input shaft, and one of the sun gear shaft, the planet gear carrier shaft, and the internal gear carrier shaft which is not the output shalt and the constant-speed input shaft constituting a variable-speed input shaft,
the electrically powered device including:
a constant-speed electric motor having a constant-speed rotor that rotates about the axis and is connected directly or indirectly to the constant-speed input shaft of the transmission device; and
a variable-speed electric motor having a variable-speed rotor that rotates about the axis and is connected directly or indirectly to the variable-speed input shaft of the transmission device;
of the variable-speed rotor and the constant-speed rotor, a first rotor having a shaft insertion hole formed therethrough in the axial direction, the shaft insertion hole having a cylindrical shape centered on the axis, and a second rotor being inserted through the shaft insertion hole of the first rotor, and
the rotor of the driving target being disposed on the axis,
wherein
the planet gear carrier includes:
the planet gear carrier shaft;
a carrier main body that supports the planet gear so as to allow the planet gear to revolve around the axis and to rotate about its center line; and
a transmission portion that transmits rotation of the planet gear carrier shaft to the carrier main body, and
the transmission portion includes:
a carrier shaft gear formed on an outer peripheral surface of the planet gear carrier shaft:
a carrier main body gear formed on an outer peripheral surface of the carrier main body;
an idle gear that rotates by meshing with the carrier shaft gear; and
a transmission shaft gear that extends in the axial direction and meshes with the idle gear and the carrier main body gear.
2. The variable electric motor system according to claim 1,
wherein the variable-speed rotor is the first rotor;
the constant-speed rotor is divided into a constant-speed rotor main body shaft and a constant-speed rotor extension shaft that is inserted through the shaft insertion hole; and
the system further comprises a constant-speed flexible coupling that connects the constant-speed rotor main body shaft and the constant-speed rotor extension shaft.
3. The variable electric motor system according to claim 1,
wherein the variable-speed electric motor includes a variable-speed stator disposed on an outer peripheral side of the variable-speed rotor and a variable-speed electric motor casing having the variable-speed stator fixed to an inner peripheral side thereof;
the transmission device includes the sun gear, the sun gear shaft, the planet gear, the internal gear, the planet gear carrier shaft, the planet gear carrier, and the internal gear carrier, and a transmission casing that covers these components; and
the transmission casing is fixed to the variable-speed electric motor casing.
4. The variable electric motor system according to claim 3,
wherein the constant-speed electric motor includes a constant-speed stator disposed on an outer peripheral side of the constant-speed rotor, and a constant-speed electric motor casing having the constant-speed stator fixed to an inner peripheral side thereof; and
the system further comprises an electrically powered device support portion that supports the constant-speed electric motor casing.
5. The variable electric motor system according to claim 4, further comprising a variable-speed electric motor support portion that supports the variable-speed electric motor casing.
6. The variable electric motor system according to claim 4, further comprising a transmission device support portion that supports the transmission casing.
7. The variable electric motor system according to claim 4,
wherein the transmission casing is fixed to the variable-speed electric motor casing.

8. The variable electric motor system according to claim 1,
wherein the variable-speed electric motor and the transmission device are supported by a shared frame.

9. The variable electric motor system according to claim 8,
wherein the variable-speed rotor is the first rotor, and
the system further comprises:
a constant-speed flexible coupling that connects the constant-speed rotor and the constant-speed input shaft; and
a gear coupling that connects the variable-speed rotor and the variable-speed input shaft.

10. The variable electric motor system according to claim 8,
wherein the variable-speed rotor is the first rotor;
the system further comprises a gear coupling that connects the variable-speed rotor and the variable-speed input shaft; and
the constant-speed rotor and the constant-speed input shaft are connected via flanges formed in the constant-speed rotor and the constant-speed input shaft, or are integrated.

11. The variable electric motor system according to claim 9,
wherein tooth trace correction is carried out on gears constituting the gear coupling.

12. The variable electric motor system according to claim 8,
wherein the variable-speed rotor is the first rotor;
the system further comprises:
a constant-speed flexible coupling that connects the constant-speed rotor and the constant-speed input shaft; and
a damper coupling that connects the variable-speed rotor and the variable-speed input shaft, and
the damper coupling includes:
a damper coupling first portion fixed to the variable-speed rotor;
a damper coupling second portion fixed to the variable-speed input shaft;
a claw portion provided in at least one of the damper coupling first portion and the damper coupling second portion;
a damper rubber that covers the claw portion; and
a claw housing hole provided in at least one of the damper coupling first portion and the damper coupling second portion, the claw portion covered by the damper rubber fitting into the claw housing hole.

13. The variable electric motor system according to claim 1, further comprising:
a constant-speed flexible coupling that connects the constant-speed rotor and the constant-speed input shaft; and
a variable-speed flexible coupling that connects the variable-speed rotor and the variable-speed input shaft.

14. The variable electric motor system according to claim 13,
wherein of the constant-speed flexible coupling and the variable-speed flexible coupling, the flexible coupling connected to the first rotor constitutes a first flexible coupling;
of the constant-speed input shaft and the variable-speed input shaft, the input shaft rotated by rotation of the first rotor constitutes a first input shaft;
a rotor-side connecting portion having an annular shape centered on the axis and connected to the first flexible coupling is formed at an end of the first rotor adjacent to the transmission device; and
a transmission device-side connecting portion having an annular shape centered on the axis and connected to the first flexible coupling so as to face the rotor-side connecting portion in the axial direction is formed at an end of the first input shaft adjacent to the electrically powered device.

15. The variable electric motor system according to claim 13,
wherein of the constant-speed flexible coupling and the variable-speed flexible coupling, the flexible coupling connected to the first rotor constitutes the first flexible coupling and the flexible coupling connected to the second rotor constitutes a second flexible coupling;
the first flexible coupling is disposed on an outer peripheral side of the second flexible coupling relative to the axis; and
a length dimension of the second flexible coupling in an axial direction thereof is less than or equal to a length dimension of the first flexible coupling in an axial direction thereof.

16. The variable electric motor system according to claim 1,
wherein the constant-speed electric motor includes a constant-speed stator disposed on an outer peripheral side of the constant-speed rotor and a constant-speed electric motor casing having the constant-speed stator fixed to an inner peripheral side thereof;
the variable-speed electric motor includes a variable-speed stator disposed on an outer peripheral side of the variable-speed rotor and a variable-speed electric motor casing having the variable-speed stator fixed to an inner peripheral side thereof; and
the variable-speed electric motor casing is fixed to the constant-speed electric motor casing.

17. The variable electric motor system according to claim 16, further comprising an electrically powered device support portion that supports the constant-speed electric motor casing.

18. The variable electric motor system according to claim 16, further comprising a variable-speed electric motor support portion that supports the variable-speed electric motor casing.

19. The variable electric motor system according to claim 16, further comprising a cooling fan attached to an end of the second rotor remote from the transmission device,
wherein the constant-speed electric motor casing and the variable-speed electric motor casing communicate with each other so that a gas flow is produced within the constant-speed electric motor casing and within the variable-speed electric motor casing by the cooling fan rotating.

20. The variable electric motor system according to claim 1, further comprising:
a frequency conversion device that changes a frequency of power to be supplied to the variable-speed electric motor;
a first switch that puts the constant-speed electric motor into a power-supplied state or a power-cutoff state;
a second switch that puts the variable-speed electric motor into a power-supplied state or a power-cutoff state; and
a controller that makes an instruction, to the frequency conversion device, indicating the frequency of the power to be supplied to the variable-speed electric motor, and instructs the first switch and the second switch to be turned on and off.

21. The variable electric motor system according to claim 20,
wherein the sun gear shaft constitutes the output shaft, the planet gear carrier shaft constitutes the variable-speed input shaft, and the internal gear carrier shaft constitutes the constant-speed input shaft; and
upon receiving an instruction to start up, the controller instructs the second switch to be turned on to put the variable-speed electric motor into the power-supplied state; makes an instruction, to the frequency conversion device, indicating a predetermined minimum frequency; and
after the variable-speed electric motor has started to be driven at minimum RPM, instructs the first switch to be turned on to put the constant-speed electric motor into the power-supplied state.

22. The variable electric motor system according to claim 20,
wherein the sun gear shaft constitutes the output shaft, the planet gear carrier shaft constitutes the variable-speed input shaft, and the internal gear carrier shaft constitutes the constant-speed input shaft; and
upon receiving an instruction to start up, the controller instructs the first switch to be turned on and puts the constant-speed electric motor into the power-supplied state, and after the constant-speed electric motor has started to be driven at predetermined RPM, instructs the second switch to be turned on to put the variable-speed electric motor into the power-supplied state, and makes an instruction, to the frequency conversion device, indicating a predetermined minimum frequency.

23. The variable electric motor system according to claim 20,
wherein the frequency conversion device is a reversible frequency conversion device capable of changing a direction of a current to be supplied to the variable-speed electric motor; and
the controller executes:
a determination step of determining, upon receiving a change in the RPM of the output shaft, whether or not it is necessary to change the direction of the current to be supplied to the variable-speed electric motor in order to achieve post-change RPM of the output shaft;
a switch off instruction step of, upon determining that it is necessary to change the direction of the current to be supplied to the variable-speed electric motor, instructing the second switch to be turned off to put the variable-speed electric motor into the power-cutoff state;
a switch on/current direction change instruction step of, after the variable-speed electric motor has entered the power-cutoff state, instructing the second switch to be turned on to put the variable-speed electric motor into the power-supplied state, and instructing the frequency conversion device to change the direction of the current to be supplied to the variable-speed electric motor; and
a target frequency instruction step of, after the variable-speed electric motor has started to be driven in reverse in response to the direction of the current to be supplied to the variable-speed electric motor being changed, instructing a frequency necessary for achieving the post-change RPM of the output shaft as the frequency of the power to be supplied to the variable-speed electric motor.

24. The variable electric motor system according to claim 23,
wherein the transmission device includes a brake that restricts rotation of the variable-speed input shaft; and
the controller executes a brake operation instruction step of instructing the brake to restrict the variable-speed input shaft after the variable-speed electric motor has been put into the power-cutoff state in the execution of the switch off instruction step, and instructing the brake to cancel the restriction on the variable-speed input shaft before the variable-speed electric motor is driven in reverse.

25. The variable electric motor system according to claim 23,
wherein the controller executes:
a first minimum frequency instruction step of making an instruction, to the frequency conversion device, indicating a predetermined minimum frequency as the frequency of the power to be supplied to the variable-speed electric motor before executing the switch off instruction step in a case of determining in the determination step that it is necessary to change the direction of the current to be supplied to the variable-speed electric motor; and
a second minimum frequency instruction step of making an instruction indicating the minimum frequency as the frequency of the power to be supplied to the variable-speed electric motor, after the variable-speed electric motor is put into to the power-cutoff state in the switch off instruction step and before the target frequency instruction step is executed.

26. The variable electric motor system according to claim 1,
wherein the sun gear shaft constitutes the output shaft;
the planet gear carrier shaft constitutes the variable-speed input shaft; and
the internal gear carrier shaft constitutes the constant-speed input shaft.

27. The variable electric motor system according to claim 1,
wherein a number of poles in the variable-speed electric motor is greater than a number of poles in the constant-speed electric motor.

28. The variable electric motor system according to claim 1,
wherein the sun gear shaft and the second rotor are arranged in the axial direction, the axial direction being horizontal.

29. The variable electric motor system according to claim 1,
wherein the constant-speed electric motor, the variable-speed electric motor, the transmission device, and the driving target are arranged linearly in that order.

30. The variable electric motor system according to claim 1,
wherein the driving target is a compressor.

* * * * *